United States Patent
Garcia et al.

(10) Patent No.: US 9,791,760 B2
(45) Date of Patent: Oct. 17, 2017

(54) ELECTROCHROMIC DEVICE CONTAINING METAL OXIDE NANOPARTICLES AND ULTRAVIOLET BLOCKING MATERIAL

(71) Applicant: HELIOTROPE TECHNOLOGIES, INC., Berkeley, CA (US)

(72) Inventors: Guillermo Garcia, Oakland, CA (US); Bonil Koo, Walnut Creek, CA (US); Ivano Gregoratto, Oakland, CA (US); Sourav Basu, Oakland, CA (US); Evelyn Rosen, Berkeley, CA (US); Jason Holt, Larkspur, CA (US); Scott Thomsen, South Lyon, MI (US)

(73) Assignee: HELIOTROPE TECHNOLOGIES, INC., Alameda, CA (US)

( * ) Notice: Subject to any disclaimer, the term of this patent is extended or adjusted under 35 U.S.C. 154(b) by 0 days.

(21) Appl. No.: 14/882,169

(22) Filed: Oct. 13, 2015

(65) Prior Publication Data
US 2016/0139476 A1   May 19, 2016

Related U.S. Application Data

(60) Provisional application No. 62/079,850, filed on Nov. 14, 2014.

(51) Int. Cl.
*G02F 1/15* (2006.01)
*G02F 1/153* (2006.01)
(Continued)

(52) U.S. Cl.
CPC ............ *G02F 1/157* (2013.01); *G02F 1/0123* (2013.01); *G02F 1/133308* (2013.01);
(Continued)

(58) Field of Classification Search
USPC ........ 359/237, 242–245, 267, 290–292, 295, 359/296, 298, 246, 250–253, 265, 266, 359/269, 270–275, 277, 315, 322
See application file for complete search history.

(56) References Cited

U.S. PATENT DOCUMENTS 4,325,611 A   4/1982  Huggins et al.
5,371,138 A   12/1994 Schaefer et al.
(Continued)

OTHER PUBLICATIONS

International Searching Report and Written Opinion of the International Searching Authority for PCT/US2015/0055280, 30 pages, mailed Mar. 25, 2016.
(Continued)

*Primary Examiner* — Brandi Thomas
(74) *Attorney, Agent, or Firm* — The Marbury Law Group PLLC

(57) ABSTRACT

An electrochromic device includes a nanostructured transition metal oxide bronze layer that includes one or more transition metal oxide and one or more dopant. The electrochromic device also includes nanoparticles containing one or more transparent conducting oxide (TCO), a solid state electrolyte, a counter electrode, and at least one protective layer to prevent degradation of the one or more nanostructured transition metal oxide bronze. The nanostructured transition metal oxide bronze selectively modulates transmittance of near-infrared (NIR) and visible radiation as a function of an applied voltage to the device.

36 Claims, 21 Drawing Sheets

(51) Int. Cl.
| | |
|---|---|
| G02F 1/157 | (2006.01) |
| G02F 1/01 | (2006.01) |
| G02F 1/1333 | (2006.01) |
| G02F 1/155 | (2006.01) |
| G02F 1/163 | (2006.01) |

(52) U.S. Cl.
CPC ............ *G02F 1/155* (2013.01); *G02F 1/1508* (2013.01); *G02F 1/1523* (2013.01); *G02F 1/1525* (2013.01); *G02F 1/1533* (2013.01); *G02F 1/163* (2013.01); *G02F 2001/133311* (2013.01); *G02F 2001/1519* (2013.01); *G02F 2001/1536* (2013.01); *G02F 2001/1555* (2013.01)

(56) References Cited

U.S. PATENT DOCUMENTS

| | | | |
|---|---|---|---|
| 5,793,518 | A | 8/1998 | Lefrou et al. |
| 5,919,571 | A * | 7/1999 | Badding ................ G02F 1/155 359/269 |
| 6,115,171 | A * | 9/2000 | Minami ................ G02F 1/1533 359/237 |
| 2005/0104136 | A1* | 5/2005 | Edwards ................ B82Y 20/00 257/400 |
| 2013/0107345 | A1 | 5/2013 | Kailasam et al. |
| 2013/0182307 | A1 | 7/2013 | Gillaspie et al. |

OTHER PUBLICATIONS

Heusing, S. "A Contribution to Climate Protection—Electrochromic Windows Fabricated With the Sol-Gel Technology," Annual Report Jahresbericht of Leibniz Institut Fr Neue Materialien Ein Institut Der Leibniz-Gemeinscfaft, pp. 90-99, (URL : http://scidok.sulb.uni-saarland.de/volltexte/2011/3459/), (2011).

Lee, D. C. et al., "Synthesis and Magnetic Properties of Silica-Coated FePt Nanocrystals," J. Phys. Chem B, vol. 110, pp. 111160-11166, (2006).

Adachi, K. et al., "Activation of Plasmons and Polarons in Solar Control Cesium Tungsten Bronze and Reduced Tungsten Oxide Nanoparticles," J. Mater. Res., vol. 27, No. 6, pp. 965-970, (2012).

Gordon, T. R., et al., "Shape-Dependent Plasmonic Response and Directed Self-Assembly in a New Semiconductor Building Block, Indium-Doped Cadmium Oxide (ICO)," Nano Lett., vol. 13, pp. 2857-2863, (2013).

Kriegel, I. et al., "Shedding Light on Vacancy-Doped Copper Chalcogenides: Shape-Controlled Synthesis, Optical Properties, and Modeling of Copper Telluride Nanocrystals with Near-Infrared Plasmon Resonances," ACS Nano, vol. 7, No. 5, pp. 4367-4377, (2013).

Noguez, C., "Surface Plasmons on Metal Nanoparticles: The Influence of Shape and Physical Environment," J. Phys. Chem., vol. 111, pp. 3806-3819, (2007).

Oh, M. H., "Large-Scale Synthesis of Bioinert Tantalum Oxide Nanoparticles for X-ray Computed Tomography Imaging and Bimodal Image-Guided Sentinel Lymph Node Mapping," J. Am. Chem. Soc., vol. 133, pp. 5508-5515, (2011).

International Preliminary Report on Pantentability and Written Opinion of the International Searching Authority for International Patent Application No. PCT/US2015/0055280, dated May 26, 2017, 27 pages.

* cited by examiner

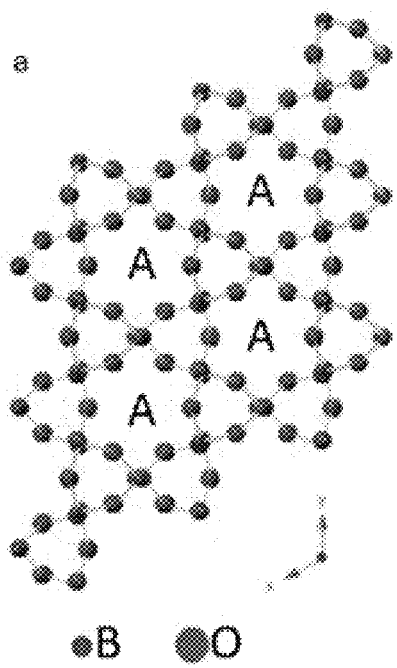
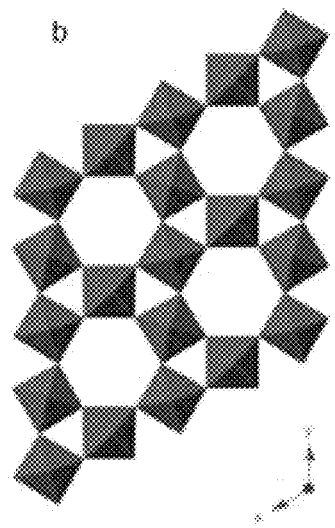
FIG. 3A          FIG. 3B
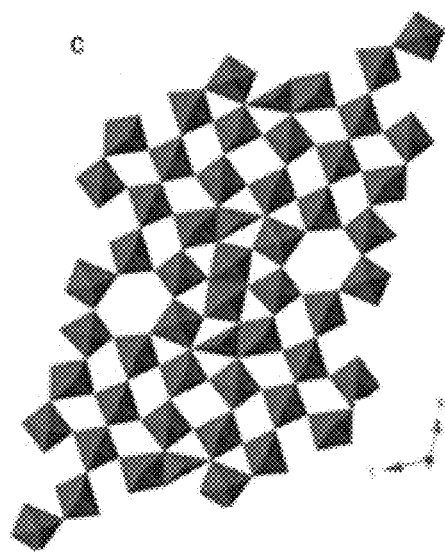
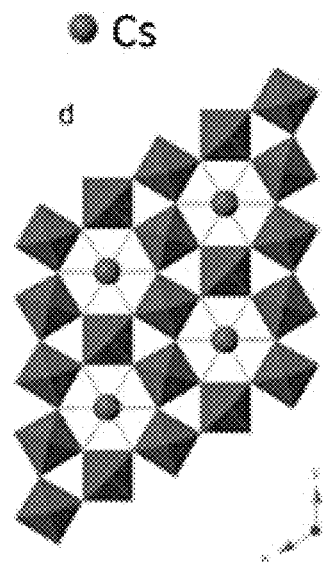
FIG. 3C          FIG. 3D

| Peak | Area | RSF | Composition (at %) |
|---|---|---|---|
| Cs 3d$_{5/2}$ | 450 | 7.041 | 18.2% |
| W 4f | 1030 | 3.523 | 81.7% |

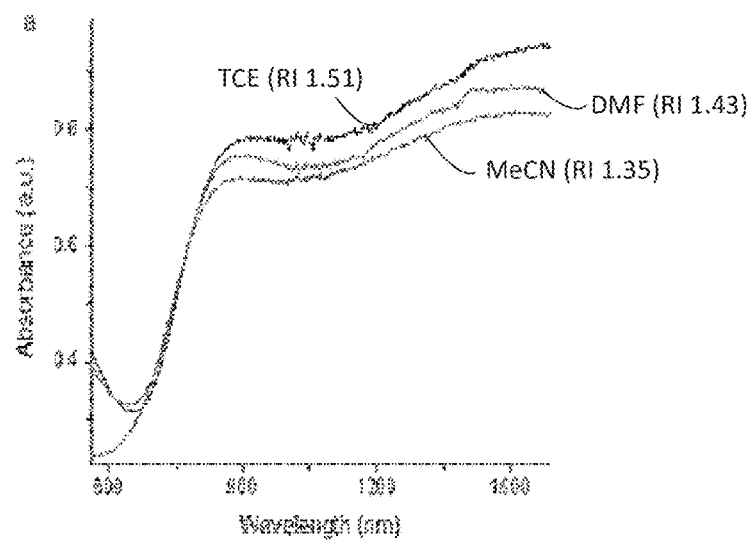
FIG. 4A
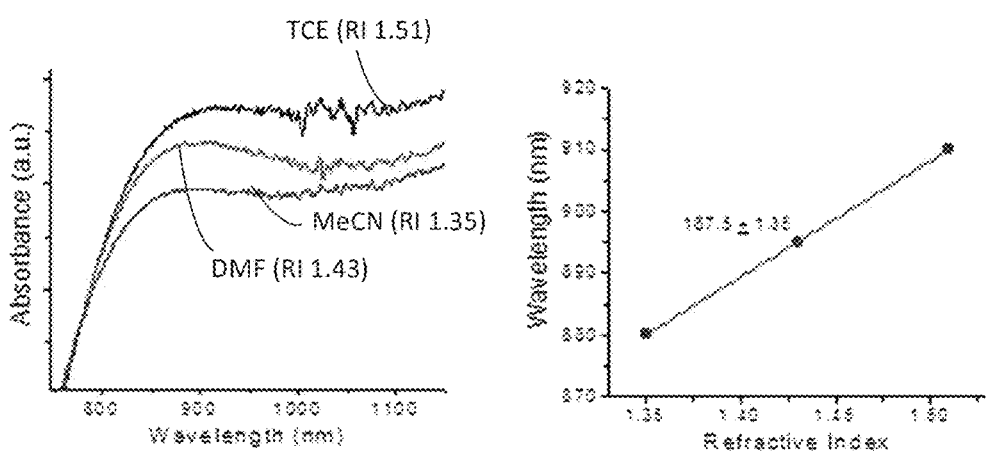
FIG. 4B
FIG. 4C

Parameters

|  | Area | Center | Width | Height |
|---|---|---|---|---|
| Left Peak | 709.43 | 6376.16 | 2389.6 | 0.24 |
| Right Peak | 2440.39 | 9178.08 | 4567.23 | 0.43 |

Statistics

| DF | 1889 |
|---|---|
| R squared | 0.99 |
| ReducedChiSq | 2.19E-04 |

Calculated Carrier Density

5.17E+21 cm-3    Right Peak
2.28E+21 cm-3    Left Peak

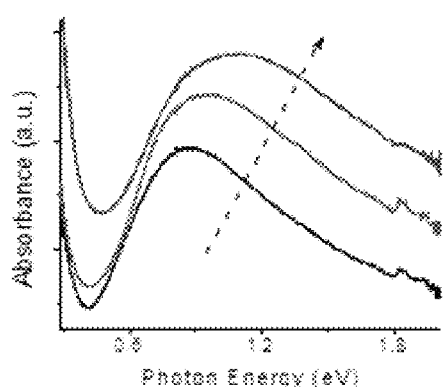 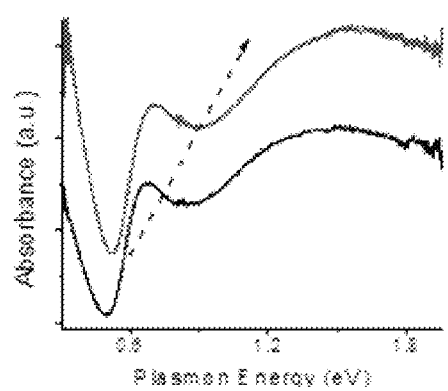
FIG. 6B                    FIG. 6C

ELECTROCHROMIC DEVICE CONTAINING METAL OXIDE NANOPARTICLES AND ULTRAVIOLET BLOCKING MATERIAL

STATEMENT OF GOVERNMENT SUPPORT

This invention was made with government support under Contract No. DE-AC02-05CH11231 awarded by the U.S. Department of Energy. The government has certain rights in this invention.

FIELD

The present invention is generally directed to electrochromic devices, and more particularly to the selectively modulating transmittance of radiation as a function of voltage applied to a nanostructured material in an electrochromic device.

BACKGROUND OF THE INVENTION

Residential and commercial buildings represent a prime opportunity to improve energy efficiency and sustainability in the United States. The buildings sector alone accounts for 40% of the United States' yearly energy consumption (40 quadrillion BTUs, or "quads", out of 100 total), and 8% of the world's energy use. Lighting and thermal management each represent about 30% of the energy used within a typical building, which corresponds to around twelve quads each of yearly energy consumption in the US. Windows cover an estimated area of about 2,500 square km in the US and are a critical component of building energy efficiency as they strongly affect the amount of natural light and solar gain that enters a building. Recent progress has been made toward improving window energy efficiency through the use of inexpensive static coatings that either retain heat in cold climates (low emissive films) or reject solar heat gain in warm climates (near-infrared rejection films).

Currently, static window coatings can be manufactured at relatively low cost. However, these window coatings are static and not well suited for locations with varying climates. An electrochromic (EC) window coating overcomes these limitations by enhancing the window performance in all climates. EC window coatings undergo a reversible change in optical properties when driven by an applied potential. Traditional EC materials, such as $WO_3$, $Nb_2O_5$, and NiO, primarily modulate radiation in the visible spectral region, while radiation in the near-infrared (NIR) spectral region remains either unchanged or switches simultaneously with visible region of light. Further, performance of electrochromic materials may degrade from use over time as a result of repeated exposure to radiation in the ultraviolet (UV) spectral region.

SUMMARY OF THE INVENTION

An embodiment electrochromic device includes a first transparent conductor layer, a working electrode, a solid state electrolyte, and a counter electrode, a second transparent conductor layer. In an embodiment, the working electrode includes transparent conducting oxide nanoparticles and a nanostructured transition metal oxide bronze layer of one or more transition metal oxide and one or more dopant species.

In one embodiment device contains at least one ultraviolet (UV) radiation protective layer configured to reduce degradation of the nanostructured transition metal oxide bronze layer.

In another embodiment, at least one of the working electrode layer and the counter electrode layer further comprises at least one nanostructured amorphous transition metal oxide that selectively modulates transmittance of visible radiation to absorb shorter wavelength visible radiation than a longer wavelength visible radiation absorbed by the nanostructured transition metal oxide bronze layer.

In another embodiment, the nanostructured transition metal oxide bronze layer comprises a plurality of transition metal oxide bronze nanoparticles, wherein a first portion of the plurality of transition metal oxide bronze nanoparticles have a cubic unit cell lattice structure, and wherein a second portion of the plurality of transition metal oxide bronze nanoparticles have a hexagonal unit cell lattice structure.

In an embodiment method of operating an electrochromic device that has at least one transparent conductor layer, a nanostructured transition metal oxide bronze layer with one or more transition metal oxide and one or more dopant, a solid state electrolyte, and a counter electrode includes applying a first voltage to the device such that the nanostructured transition metal oxide bronze selectively modulates transmittance of near-infrared (NIR) radiation, and applying a second voltage having a larger absolute value than the first voltage to the device such that the nanostructured transition metal oxide bronze selectively modulates transmittance visible spectrum radiation.

In an embodiment method of operating an electrochromic device that has at least one transparent conductor layer, a working electrode including a nanostructured transition metal oxide bronze layer and nanostructured transparent conducting oxide, a solid state electrolyte, and a counter electrode, the method includes applying a first voltage to the device such that the nanostructured transition metal oxide bronze layer and the nanostructured transparent conducting oxide selectively modulate transmittance of near-infrared (NIR) radiation, and applying a second voltage having a larger absolute value than the first voltage to the device such that the nano structured transition metal oxide bronze layer selectively modulates transmittance of visible radiation. In an embodiment, the nanostructured transition metal oxide bronze layer includes at least one transition metal oxide and one or more dopant.

BRIEF DESCRIPTION OF THE DRAWINGS

FIG. 3A is a ball-and-stick model crystal structure of a composition in various embodiments.

FIGS. 3B-3D are polyhedral models of compositions of the various embodiments.

FIGS. 4A-4C are graphs showing absorbance spectra of hexagonal prism $Cs_{0.29}WO_3$ in solvents of varying refractive indexes.

FIGS. 6B and 6C are absorbance spectra of progressing reactions for samples having different shapes in the various embodiments.

DETAILED DESCRIPTION OF THE EMBODIMENTS

Figure 1A:
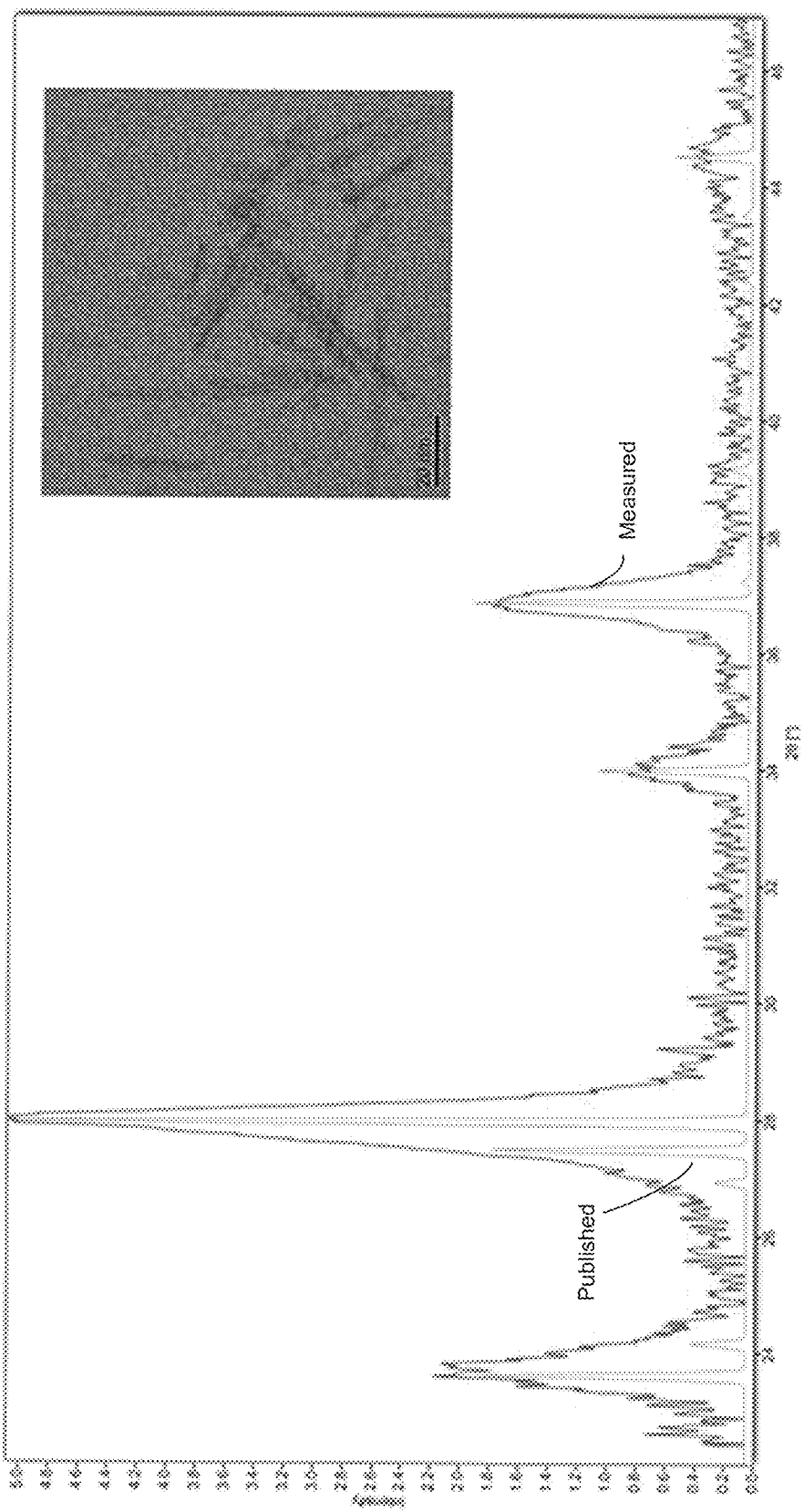
FIG. 1A is a graph showing measured and published x-ray diffraction patterns for $Rb_{0.29}WO_3$ with an inset transmission electron microscopy (TEM) image of synthesized nanocrystals.

An embodiment of the invention provides electrochromic nanostructured material capable of selectively modulating radiation in near-infrared (NIR) and visible spectral regions. The material may consist of nano structured doped transition metal oxides with ternary compounds of the type $A_xM_zO_y$. In various embodiment $A_xM_zO_y$ compounds, if it is assumed that z=1, then $0.08 \leq x \leq 0.5$ (preferably $0.25 \leq x \leq 0.35$), and $2 \leq y \leq 3$. In various embodiments, since the nanostructures may be non-uniform as a function of depth, x may represent an average doping content. To operate, the subject material may be fabricated into an electrode that will change optical properties after driven by an applied voltage.

In order to improve the performance of EC window coatings, selective modulation of NIR and visible spectra radiation, and avoidance of degrading effects of UV radiation, may be desired. Various embodiments may provide single-component electrochromic nanostructured materials capable of selectively modulating NIR and visible spectral regions. Further, since certain spectral regions may damage the electrochromic nanostructured material, the various embodiments may incorporate at least one protective material and/or protective layer to prevent such damage.

The various embodiments provide devices and methods for enhancing optical changes in windows using electrochromic nanostructured materials fabricated into an electrode to form an electrochromic device. In various embodiments, the material may undergo a reversible change in optical properties when driven by an applied potential. Based on the applied potential, the electrochromic nanostructured materials may modulate NIR radiation (wavelength of around 780-2500 nm), as well as visible radiation (wavelength of around 400-780 nm). In an example, the device may include a first nanostructured material that modulates radiation in a portion of the NIR spectral region and in the visible spectral region, and a second nanostructured material that modulates radiation in an overlapping portion of the NIR spectral region such that the NIR radiation modulated by the device as a whole is enhanced and expanded relative to that of just the first nanostructured material. In various embodiments, the material may operate in multiple selective modes based on the applied potential.

Further, the various embodiments may include at least one protective material to prevent or reduce damage to an electrochromic nanostructured material that may result from repeated exposure to radiation in the UV spectral region. In an example, a protective material may be used to form at least one barrier layer in the device that is positioned to block UV radiation from reaching the first nanostructured material and electrolyte. In another example, a protective material may be used to form a layer that is positioned to block free electron or hole charge carriers created in the electrolyte due to absorption of UV radiation by the nanostructured electrode material from migrating to that material, while allowing conduction of ions from the electrolyte (i.e., an electron barrier and ion conductor).

In various embodiments, control of individual operating modes for modulating absorption/transmittance of radiation in specific spectral regions may occur at different applied biases. Such control may provide users with the capability to achieve thermal management within buildings and other enclosures (e.g., vehicles, etc.), while still providing shading when desired.

Figure 7A:
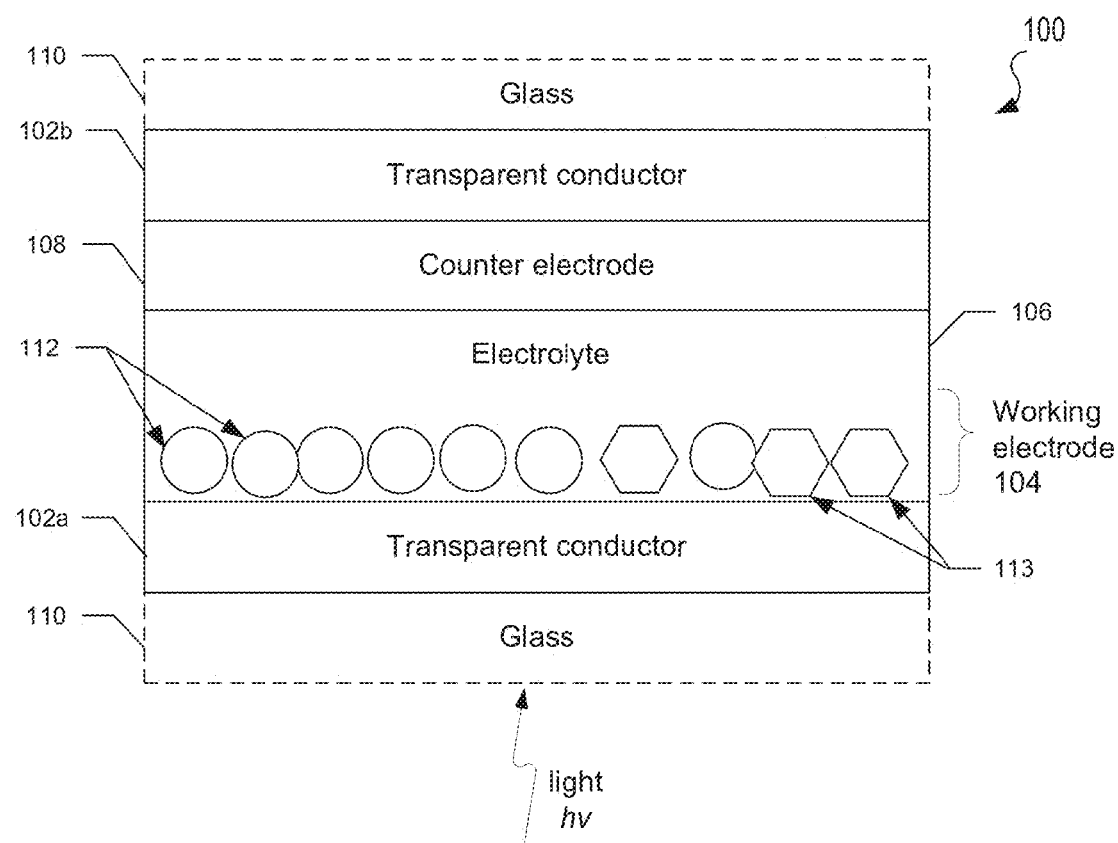
FIGS. 7A-7C are schematic representations of electrochromic devices according to various embodiments.
Figure 7B:
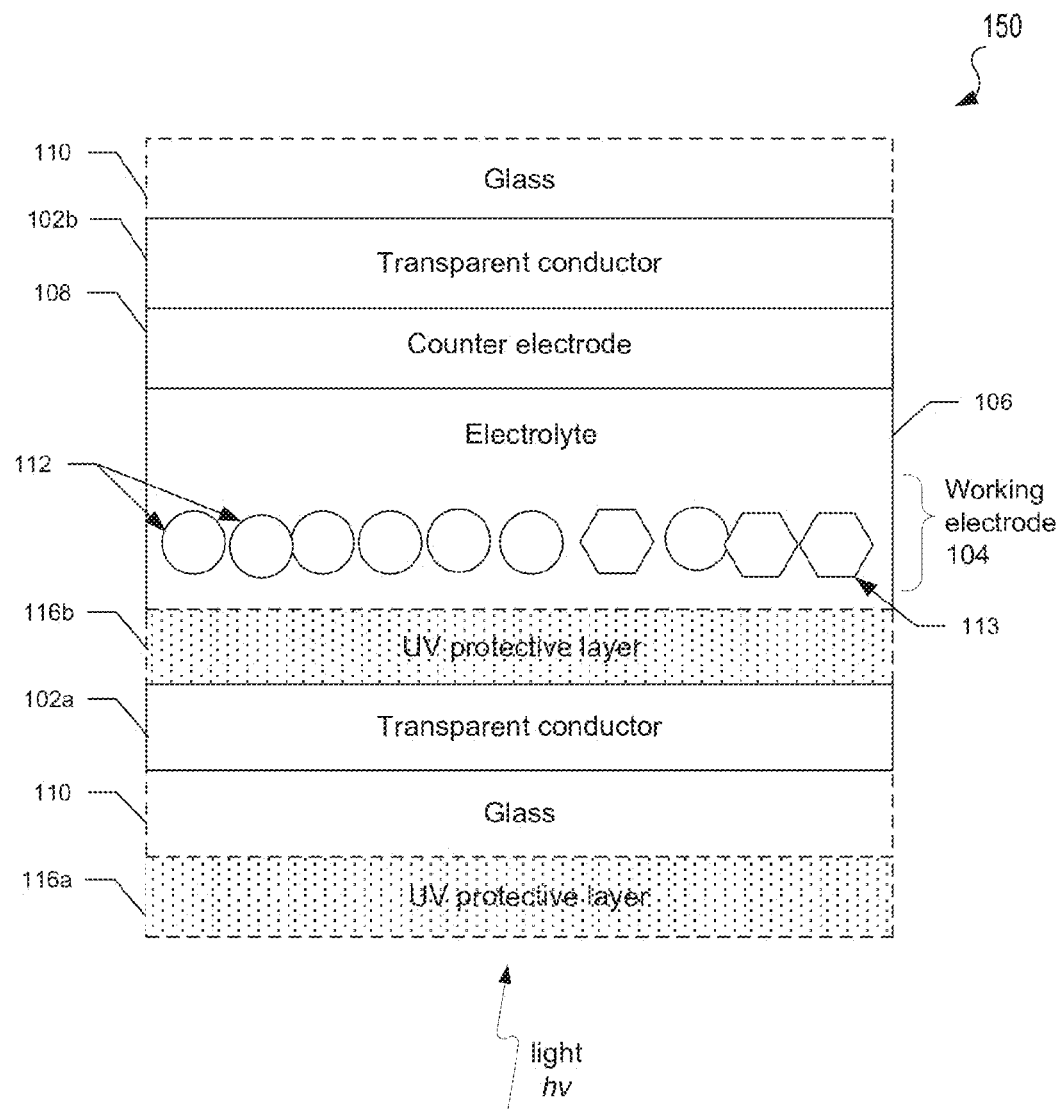
Figure 7C:
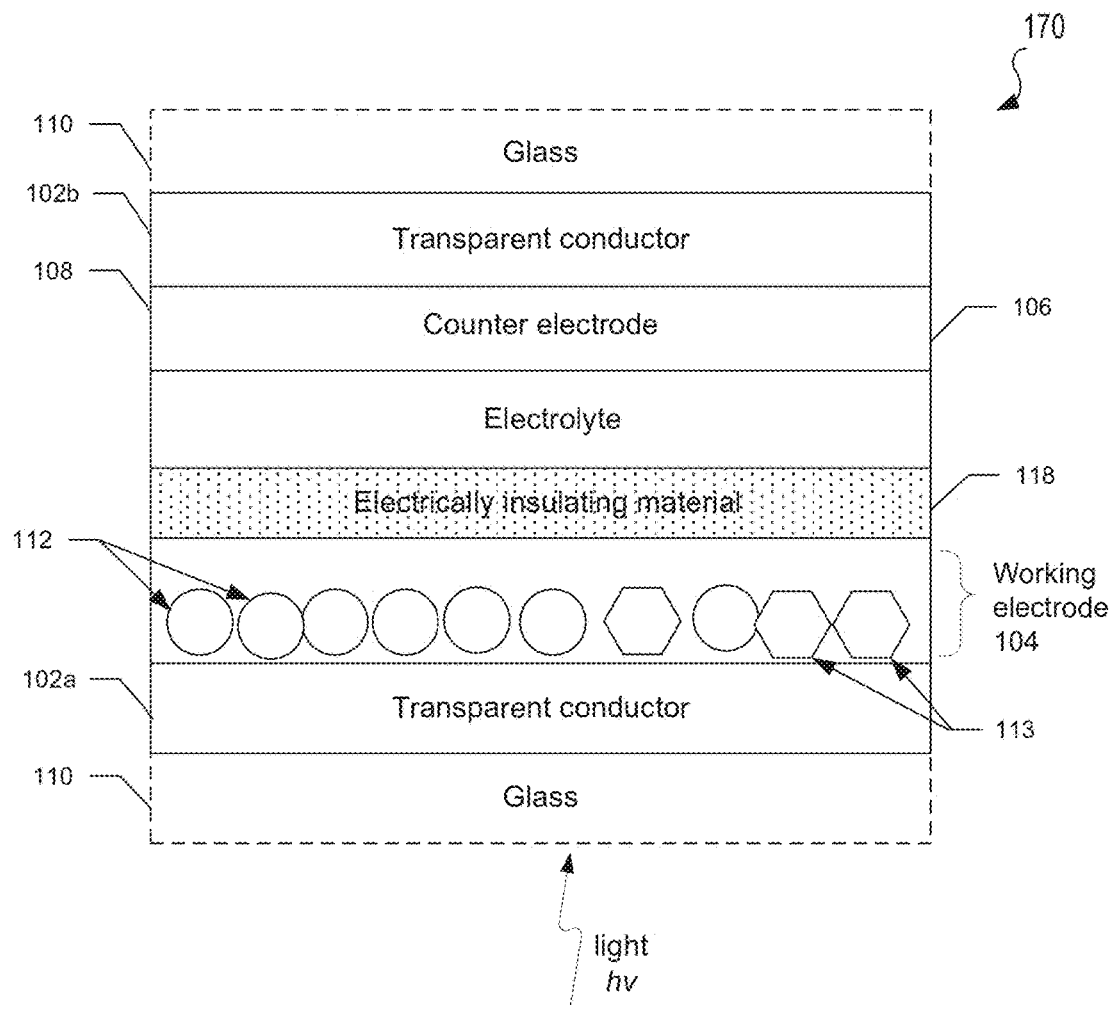

FIGS. 7A-7C illustrate embodiment electrochromic devices. It should be noted that such electrochromic devices may be oriented upside down or sideways from the orientations illustrated in FIGS. 7A-7C. Furthermore, the thickness of the layers and/or size of the components of the devices in FIGS. 7A-7C are not drawn to scale or in actual proportion to one another other, but rather are shown as representations.

In FIG. 7A, an embodiment electrochromic device 100 may include a first transparent conductor layer 102a, a working electrode 104, a solid state electrolyte 106, a counter electrode 108, and a second transparent conductor layer 102b. Some embodiment electrochromic devices may also include one or more optically transparent support layer, such as plastic or glass layer 110 positioned in front of the first transparent conductor layer 102a and/or positioned behind the second transparent conductor layer 102b.

The first and second transparent conductor layers 102a, 102b may be formed from transparent conducting films fabricated using inorganic and/or organic materials. For example, the transparent conductor layers 102a, 102b may include inorganic films of transparent conducting oxide (TCO) materials, such as indium tin oxide (ITO) or fluorine doped tin oxide (FTO). In other examples, organic films in transparent conductor layers 102a, 102b may include graphene and/or various polymers.

In the various embodiments, the working electrode 104 may include nanostructures 112 of a doped transition metal oxide bronze, as well as nanostructures 113 of a transparent conducting oxide (TCO) composition shown schematically as circles and hexagons for illustration purposes only. As discussed above, the thickness of the layers of the device 100, including and the shape, size and scale of nanostructures is not drawn to scale or in actual proportion to each other, but is represented for clarity. In the various embodiments, nanostructures 112, 113 may be embedded in an optically transparent matrix material or provided as a packed or loose layer of nanostructures exposed to the electrolyte.

In the various embodiments, the doped transition metal oxide bronze of nanostructures 112 may be a ternary composition of the type AxMzOy, where M represents a transition metal ion species in at least one transition metal oxide, and A represents at least one dopant. Transition metal oxides that may be used in the various embodiments include, but are not limited to any transition metal oxide which can be reduced and has multiple oxidation states, such as niobium oxide, tungsten oxide, molybdenum oxide, vanadium oxide, titanium oxide and mixtures of two or more thereof. In one example, the nanostructured transition metal oxide bronze may include a plurality of tungsten oxide ($WO_{3-x}$) nanoparticles, where $0 \leq x \leq 0.33$, such as $0 \leq x \leq 0.1$.

In various embodiments, the at least one dopant species may be a first dopant species that, upon application of a particular first voltage range, causes a first optical response. The applied voltage may be, for example, a negative bias voltage. Specifically, the first dopant species may cause a surface plasmon resonance effect on the transition metal oxide by creating a significant population of delocalized electronic carriers. Such surface plasmon resonance may cause absorption of NIR radiation at wavelengths of around 780-2000 nm, with a peak absorbance at around 1200 nm. In various embodiments, the specific absorbances at different wavelengths may be varied/adjusted based other factors (e.g., nanostructure shape, size, etc.), discussed in further detail below. In the various embodiments, the first dopant species may be an ion species selected from the group of cesium, rubidium, and lanthanides (e.g., cerium, lanthanum, praseodymium, neodymium, promethium, samarium, europium, gadolinium, terbium, dysprosium, holmium, erbium, thulium, ytterbium, and lutetium).

In various embodiments, the dopant may include a second dopant species that causes a second optical response based upon application of a voltage within a different, second particular range. The applied voltage may be, for example, a negative bias voltage. In an embodiment, the second dopant species may migrate between the solid state electrolyte 106 and the nanostructured transition metal oxide bronze of the working electrode 104 as a result of the applied voltage. Specifically, the application of voltage within the particular range may cause the second dopant species to intercalate and deintercalate the transition metal oxide structure. In this manner, the second dopant may cause a change in the oxidation state of the transition metal oxide, which may cause a polaron effect and a shift in the lattice structure of the transition metal oxide. This shift may cause absorption of visible radiation, for example, at wavelengths of around 400-780 nm.

In various embodiments, the second dopant species may be an intercalation ion species selected from the group of lanthanides (e.g., cerium, lanthanum, praseodymium, neodymium, promethium, samarium, europium, gadolinium, terbium, dysprosium, holmium, erbium, thulium, ytterbium, and lutetium), alkali metals (e.g., lithium, sodium, potassium, rubidium, and cesium), and alkali earth metals (e.g., beryllium, magnesium, calcium, strontium, and barium). In other embodiments, the second dopant species may include a charged proton species.

In various embodiments, nanostructures 113 may be mixed with the doped transition metal oxide bronze nanostructures 112 in the working electrode 104. In the various embodiments, the nanostructures 113 may include at least one TCO composition, which prevents UV radiation from reaching the electrolyte and generating electrons. In an example embodiment, the nanostructures 113 may include an indium tin oxide (ITO) composition, which may be a solid solution of around 60-95 wt % (e.g., 85-90 wt %) indium(III) oxide ($In_2O_3$) and around 5-40 wt % (e.g., 10-15 wt %) tin(IV) oxide ($SnO_2$). In another example embodiment, the nanostructures 113 may include an aluminum-doped zinc oxide (AZO) composition, which may be a solid solution of around 99 wt % zinc oxide (ZnO) and around 2 wt % aluminum(III) oxide ($Al_2O_3$). Additional or alternative TCO compositions that may be used to form nanostructures 113 in the various embodiments include, but are not limited to, indium oxide, zinc oxide and other doped zinc oxides such as gallium-doped zinc oxide and indium-doped zinc oxide.

The TCO composition of nanostructures 113 may be transparent to visible light and, upon application of the first voltage, may modulate absorption of NIR radiation at wavelengths of around 1200-2500 nm, with peak absorbance around 2000 nm (e.g., at a longer peak wavelength than the bronze nanoparticles 112, but with overlapping absorption bands). In particular, application of the first voltage may cause an increase in free electron charge carriers, and therefore cause a surface plasmon resonance effect in at least one TCO composition of nanostructures 113. In an embodiment in which the TCO composition is ITO, the surface plasmon resonance effect may be caused by oscillation of free electrons produced by the replacement of indium ions ($In^{3+}$) with tin ions ($Sn^{4+}$). Similar to the transition metal oxide bronze, such surface plasmon resonance may cause a change in absorption properties of the TCO material. In some embodiments, the change in absorption properties may be an increase in absorbance of NIR radiation at wavelengths that overlaps with that of the nanostructures 112. Therefore, the addition of TCO composition nanostructures 113 to the working electrode 104 may serve to expand the range of NIR radiation absorbed (e.g., at wavelengths of around 780-2500 nm) compared to that of the nanostructures 112 alone (e.g., at wavelengths of around 780-2000 nm), and to enhance absorption of some of that NIR radiation (e.g., at wavelengths of around 1200-2000 nm).

Based on these optical effects, the nanostructures 112, 113 of the working electrode may progressively modulate transmittance of NIR and visible radiation as a function of applied voltage by operating in at least three different modes. For example, a first mode may be a highly solar transparent ("bright") mode in which the working electrode 104 is transparent to NIR radiation and visible light radiation. A second mode may be a selective-IR blocking ("cool") mode in which the working electrode 104 is transparent to visible light radiation but absorbs NIR radiation. A third mode may be a visible blocking ("dark") mode in which the working electrode 104 absorbs radiation in the visible spectral region and at least a portion of the NIR spectral region. In an example, application of a first voltage having a negative bias may cause the electrochromic device to operate in the cool mode, blocking transmittance of NIR radiation at wavelengths of around 780-2500 nm. In another example, application of a second negative bias voltage having a higher absolute value than the first voltage may cause the electrochromic device to operate in the dark state, blocking transmittance of visible radiation (e.g., at wavelengths of around 400-780 nm) and NIR radiation at wavelengths of around 780-1200 nm. In another example, application of a third voltage having a positive bias may cause the electrochromic device to operate in the bright state, allowing transmittance of radiation in both the visible and NIR spectral regions. In various embodiments, the applied voltage may be between −5V and 5V, preferably between −2V and 2V. For example, the first voltage may be −0.25V to −0.75V, and the second voltage may be −1V to −2V. In another example, the absorbance of radiation at a wavelength of 800-1500 nm by the electrochromic device may be at least 50% greater than its absorbance of radiation at a wavelength of 450-600 nm.

In various embodiments, the solid state electrolyte 106 may include at least a polymer material and a plasticizer material, such that electrolyte may permeate into crevices between the transition metal oxide bronze nanoparticles 112 (and/or nanoparticles 113 if present). The term "solid state," as used herein with respect to the electrolyte 106, refers to a polymer-gel and/or any other non-liquid material. In some embodiments, the solid state electrolyte 106 may further include a salt containing, for example, an ion species selected from the group of lanthanides (e.g., cerium, lanthanum, praseodymium, neodymium, promethium, samarium, europium, gadolinium, terbium, dysprosium, holmium, erbium, thulium, ytterbium, and lutetium), alkali metals (e.g., lithium, sodium, potassium, rubidium, and cesium), and alkali earth metals (e.g., beryllium, magnesium, calcium, strontium, and barium). In an example embodiment, such salt in the solid state electrolyte 106 may contain a lithium and/or sodium ions. In some embodiments, the solid state electrolyte 106 may initially contain a solvent, such as butanol, which may be evaporated off once the electrochromic device is assembled. In some embodiments, the solid state electrolyte 106 may be around 40-60 wt % plasticizer material, preferably around 50-55 wt % plasticizer material. In an embodiment, the plasticizer material may include at least one of tetraglyme and an alkyl hydroperoxide. In an embodiment, the polymer material of the solid state electrolyte 106 may be polyvinylbutyral (PVB), and the salt may be lithium bis(trifluoromethane). In other embodiments, the solid state electrolyte 106 may include at least one of lithium phosphorus oxynitride (LiPON) and tantalum pentoxide ($Ta_2O_5$).

The counter electrode 108 of the various embodiments should be capable of storing enough charge to sufficiently balance the charge needed to cause visible tinting to the nanostructured transition metal oxide bronze in the working electrode 104. In various embodiments, the counter electrode 108 may be formed as a conventional, single component film, a nanostructured film, or a nanocomposite layer.

In some embodiments, the counter electrode 108 may be formed from at least one passive material that is optically transparent to both visible and NIR radiation during the applied biases. Examples of such passive counter electrode materials may include $CeO_2$, $CeVO_2$, $TiO_2$, indium tin oxide, indium oxide, tin oxide, manganese or antimony doped tin oxide, aluminum doped zinc oxide, zinc oxide, gallium zinc oxide, indium gallium zinc oxide, molybdenum doped indium oxide, $Fe_2O_3$, and/or $V_2O_5$. In other embodiments the counter electrode 108 may be formed from at least one complementary material, which may be transparent to NIR radiation but which may be oxidized in response to application of a bias, thereby causing absorption of visible light radiation. Examples of such complementary counter electrode materials may include $Cr_2O_3$, $MnO_2$, $FeO_2$, $CoO_2$, $NiO_2$, $RhO_2$, or $IrO_2$. The counter electrode materials may include a mixture of one or more passive materials and/or one or more complementary materials described above.

Without being bound to any particular theory, it is believed that the application of a first voltage in the various embodiments may cause the interstitial dopant species (e.g., cesium) in the crystal structure of the transition metal oxide bronze to have a greater amount of free carrier electrons and/or to cause the interstitial dopant species (e.g., lithium ions from the electrolyte) to perform non-faradaic capacitive or pseudo-capacitive charge transfer on the surface of the nanostructures 112, which may cause the surface plasmon resonance effect to increase the absorption of NIR radiation. In this manner, the absorption properties of the transition metal oxide bronze characteristics may change (i.e., increased absorption of NIR radiation) upon application of the first voltage. Further, application of a second voltage having a higher absolute value than the first voltage in the various embodiments may cause faradaic intercalation of an intercalation dopant species (e.g., lithium ions) from the electrolyte into the transition metal oxide nanostructures. It is believed that the interaction of this dopant species provides interstitial dopant atoms in the lattice which creates a polaron effect. In this manner, the lattice structure of transition metal oxide nanoparticles may experience a polaron-type shift, thereby altering its absorption characteristics (i.e., shift to visible radiation) to block both visible and near infrared radiation.

In some embodiments, in response to radiation of certain spectral regions, such as UV (e.g., at wavelengths of around 10-400 nm) may cause excitons to be generated in the polymer material of the solid state electrolyte 106. The UV radiation may also excite electrons in the doped transition metal oxide bronze to move into the conduction band, leaving holes in the valence band. The generated excitons in the polymer material may dissociate to free carriers, the electrons of which may be attracted to the holes in the valence band in the doped transition metal oxide bronze (e.g., cesium-doped tungsten trioxide ($Cs_xWO_3$)) of nanoparticles 112. Since electrochemical reduction of various transition metal oxide bronzes by such free electron charge carriers may degrade their performance (i.e., from unwanted coloration of the transition metal oxide bronze), embodiment devices may include one or more layer of a protective material to prevent UV radiation from reaching the solid state electrolyte 106, in addition to or instead of nanostructures 113 mixed into the working electrode.

FIG. 7B illustrates an embodiment electrochromic device 150 that addresses degradation of the doped transition metal oxide bronze nanostructures 112. Similar to device 100 shown in FIG. 7A, device 150 may include a first transparent conductor layer 102a, a working electrode 104, a solid state electrolyte 106, a counter electrode 108, a second transparent conductor layer 102b, and one or more optically transparent support layer 110. In addition, device 150 may include one or more protective layers 116a, 116b made of a material that absorbs UV radiation. In an example embodiment, the device 150 may include a first protective layer 116a positioned in front of the first transparent conductor layer 102a. For example, the first protective layer 116a may be positioned between the first transparent conductor layer 102a and, if present, the optically transparent support layer 110. Alternatively, if present, the first protective layer 116 may be positioned in front of the optically transparent support layer 110 (i.e., on the side of the conductor layer 102a or support layer 110 opposite from the working electrode 104). In another example embodiment, the device 150 may additionally or alternatively provide a second protective layer 116b that is positioned between the first transparent conductor layer 102a and the working electrode 104.

The UV radiation absorbing material of the one or more protective layers 116a, 116b of the various embodiments may be any of a number of barrier films. For example, the one or more protective layer 116a may be a thin film of at least one TCO material, which may include a same as or different from TCO compositions in the nanostructures 113.

In an example embodiment, a protective layer 116a of the device 150 may be an ITO thin film, and therefore capable of absorbing UV radiation by band-to-band absorption (i.e., absorption of a UV photon providing enough energy to excite an electron from the valence band to the conduction band). In another example embodiment, the device may include the TCO nanostructures 113 made of ITO, as well as a protective layer 116a composed of an ITO thin film. Alternatively, the TCO nanostructures 113 may form a separate thin film layer 116b disposed between the transition metal oxide bronze nanoparticles 112 and the transparent conductor 102a. In some embodiments, the UV radiation absorbing materials of protective layers 116a, 116b may include organic or inorganic laminates.

In another embodiment, at least one UV protective layer, such as protective layer 116a in FIG. 7B, may be a UV radiation reflector made of a high index transparent metal oxide. Since birds can see radiation in the UV range, a UV reflector may be implemented in embodiments positioned as outside windows in order to prevent birds from hitting the windows. In some other embodiments, UV radiation absorbing organic molecules and/or inorganic UV radiation absorbing nanoparticles (e.g., zinc oxide, indium oxide, ITO, etc.) may be incorporated within the electrolyte 106 material.

FIG. 7C illustrates another embodiment electrochromic device 170 that addresses degradation of the doped transition metal oxide bronze nanostructures 112 by controlling the effects of the electron charge carriers generated in the electrolyte from exposure to UV radiation. Similar to devices 100 and 150 discussed above with respect to FIGS. 7A and 7B respectively, device 170 may include a first transparent conductor layer 102a, a working electrode 104, a solid state electrolyte 106, a counter electrode 108, a second transparent conductor layer 102b, and one or more optically transparent support layer 110. In addition, device 170 may include a protective layer 118 positioned between the working electrode 104 and the electrolyte 106. The protective layer 118 may be composed of one or more ionically conductive and electrically insulating material.

As discussed above, without being bound to any particular theory, it is believed that the migration of intercalation ions between the electrolyte 106 and the working electrode 104 is responsible for at least some of the device's capability to modulate spectral absorption. Therefore, in order to maintain operability of the device, the electrically insulating material used to form the protective layer 118 should also be ionically conductive. That is, the material of the protective layer 118 may prevent or reduce free electrons in the solid state electrolyte layer 106 from reducing the transition oxide bronze of nanoparticles 112, while allowing the diffusion of ions of an intercalation dopant species (e.g., Na, Li, etc.) between the electrolyte 106 and working electrode 104. In an example embodiment, the electrically insulating material that makes up the protective layer 118 may be tantalum oxide, such as tantalum pentoxide ($Ta_2O_5$), which blocks migration of electrons from the electrolyte 106 while allowing diffusion of the intercalation dopant species ions (e.g., lithium ions) from the electrolyte 106. In this manner, degradation of the transition metal oxide bronze is reduced or prevented by controlling the effect of the absorbed UV radiation in addition to or instead of instead of blocking its absorption. Other example materials that may be used to form the protective layer 118 in addition to or instead of tantalum pentoxide may include, without limitation, strontium titanate ($SrTiO_3$), zirconium dioxide ($ZrO_2$), indium oxide, zinc oxide, tantalum carbide, niobium oxide, and various other dielectric ceramics having similar electrical and/or crystalline properties to tantalum pentoxide.

In an alternative embodiment, instead of or in addition to the protective layer 118, the nanostructures 112 may each be encapsulated in a shell containing an electrically insulating and ionically conductive material, which may be the same as or different from the material of the protective layer 118 (e.g., tantalum oxide, strontium titanate, zinc oxide, indium oxide, zirconium oxide, tantalum carbide, or niobium oxide).

In an example embodiment, each nanostructure 112 may have a core of cubic or hexagonal unit cell lattice structure tungsten bronze, surrounded by a shell of tantalum pentoxide.

In some embodiments, the electrolyte 106 may include a polymer that reduces damage to the device due to UV radiation. The polymer may be any of a number of polymers that are stable upon absorption of UV radiation (e.g., no creation of proton/electron pairs). Examples of such polymers may include, but are not limited to, fluorinated polymers without hydroxyl (—OH) groups (e.g., polyvinylidene difluoride (PVDF)).

In another embodiment, a positive bias may be applied to the counter electrode 108 to draw UV radiation generated electrons from the electrolyte 106 to the counter electrode 108 in order to reduce or prevent electrons from the electrolyte 106 from moving to the working electrode 104 to avoid the free electron-caused coloration of the doped transition metal oxide bronze in the working electrode 104.

In another embodiment, a device may include more than one of, such as any two of, any three of, or all four of: (i) a protective layer of electrically insulating material (e.g., protective layer 118 or protective material shells around the bronze nanoparticles), (ii) one or more protective layer of UV radiation absorbing material (e.g., protective layer(s) 116a and/or 116b in FIG. 7B and/or UV radiation absorbing organic molecules and/or inorganic UV radiation absorbing nanoparticles incorporated within the electrolyte 106 material), (iii) electrolyte polymer that is stable upon absorption of UV radiation, and/or (iv) application of positive bias to the counter electrode 108. In various embodiments, the nanostructures 113 may be included in or omitted from electrochromic devices 150, 170.

In another embodiment, the protective layer(s) 116a and/or 116b may comprise a stack of metal oxide layers. Alternatively, the stack may comprise a separate component that is provided instead of or in addition to the layer(s) 116a and/or 116b. The stack may provide improvement in the reflected color of the electrochromic device. Prior art devices generally have a reddish/purplish color when viewed in reflection. The stack may comprise index-matched layers between the glass and transparent conductive oxide layer to avoid the reddish/purplish reflected color. As noted above, the index-matched layer can serve as the UV absorber or be used in addition to another UV absorber. The stack may comprise a zinc oxide based layer (e.g., ZnO or AZO) beneath an indium oxide based layer (e.g., indium oxide or ITO).

Compared to nanocomposite electrochromic films, the various embodiments may involve similar production by utilizing a single nanostructured material in the working electrode to achieve the desired spectral absorption control in both NIR and visible regions, and another nanostructured material to enhance and expand such control in the NIR region. Further, the various embodiments may provide one or more additional layer(s) of a protective material to minimize degradation of the single nanostructured material.

In some embodiments, the working electrode and/or the counter electrode may additionally include at least one material, such as an amorphous nano structured material, that enhances spectral absorption in the lower wavelength range of the visible region. In some embodiments, the at least one amorphous nanostructured material may be at least one nanostructured amorphous transition metal oxide.

In particular, the amorphous nano structured materials may provide color balancing to the visible light absorption that may occur due to the polaron-type shift in the spectral absorption of the doped-transition metal oxide bronze. As discussed above, upon application of the second voltage having a higher absolute value, the transition metal oxide bronze may block (i.e., absorb) radiation in the visible range. In various embodiments, the absorbed visible radiation may have wavelengths in the upper visible wavelength range (e.g., 500-700 nm), which may cause the darkened layer to appear blue/violet corresponding to the un-absorbed lower visible wavelength range (e.g., around 400-500 nm). In various embodiments, upon application of the second voltage, the at least one nanostructured amorphous transition metal oxide may absorb complementary visible radiation in the lower visible wavelength range (e.g., 400-500 nm), thereby providing a more even and complete darkening across the visible spectrum with application of the second voltage. That is, use of the amorphous nanostructured material may cause the darkened layer to appear black.

In some embodiments, at least one nanostructured amorphous transition metal oxide may be included in the working electrode 104 in addition to the doped-transition metal oxide bronze nanostructures 112 and the TCO nanostructures 113. An example of such material in the working electrode 104 may be, but is not limited to, nanostructured amorphous niobium oxide, such as niobium(II) monoxide (NbO) or other niobium oxide materials (e.g., $NbO_x$). In some embodiments, the counter electrode 108 may include, as a complementary material, at least one nanostructured amorphous transition metal oxide. That is, in addition to optically passive materials, the counter electrode 108 may include at least one material for color balancing (i.e., complementing) the visible radiation absorbed in the working electrode (i.e., by the transition metal oxide bronze. An example of such material in the counter electrode 108 may be, but is not limited to, nanostructured amorphous nickel oxide, such as nickel(II) oxide (NiO) or other nickel oxide materials (e.g., $NiO_x$).

In the various embodiments, nanostructures that form the working and/or counter electrode, including the at least one amorphous nanostructured material, may be mixed together in a single layer. An example of a mixed layer is shown in FIG. 7A with respect to transition metal oxide bronze nanostructures 112 and TCO nanostructures 113. Alternatively, nanostructures that form the working and/or counter electrode, including the at least one amorphous nanostructured material, may be separately layered according to composition. For example, a working electrode may include a layer of amorphous $NbO_x$ nanostructures, a layer of transition metal oxide bronze nanostructures, and a layer of ITO nanostructures, in any of a number of orders.

The nanostructured transition metal oxide bronzes that may be part of the working electrode 104 in various embodiment devices can be formed using any of a number of low cost solution process methodologies. For example, solutions of $Nb:TiO_2$ and $Cs_xWO_3$ may be synthesized using colloidal techniques. Compared to other synthetic methodologies, colloidal synthesis may offer a large amount of control over the nanostructure size, shape, and composition of the nano-structured transition metal oxide bronze. After deposition, a nanostructured transition metal oxide bronze material in the working electrode 104 may be subjected to a thermal post treatment in air to remove and cap ligands on the surface of the nanostructures.

In various embodiments, nanostructured amorphous transition metal oxide materials may be formed at room temperature from an emulsion and an ethoxide precursor. For example, procedures used to synthesize tantalum oxide nanoparticles that are described in "Large-scale synthesis of bioinert tantalum oxide nanoparticles for X-ray computed tomography imaging and bimodal image-guided sentinel lymph node mapping" by_MH Oh et al. (J Am Chem Soc. 2011 Apr. 13; 133(14):5508-15), incorporated by reference herein, may be similarly used to synthesize amorphous transition metal oxide nanoparticles. For example, an overall synthetic process of creating the nanoparticle, as described in Oh et al., may adopted from the microemulsion synthesis of silica nanoparticles. In such process, a mixture of cyclohexane, ethanol, surfactant, and a catalysis for the sol-gel reaction may be emulsified. The ethoxide precursor may be added to the emulsion, and uniform nanoparticles may be formed by a controlled-sol gel reaction in the reverse micelles at room temperature within around 5 minutes. The sol-gel reaction may be catalyzed, for example, by NaOH.

In some embodiments, the nanostructured amorphous transition metal oxide may be sintered at a temperature of at least 400° C. for at least 30 minutes, such as 400 to 600° C. for 30 to 120 minutes to form a porous web. In an example embodiment, the porous web may be included in a working electrode 104, with the tungsten bronze nanoparticles and ITO nanoparticles incorporated in/on the web. Alternatively, the sintering step may be omitted and the nano structured amorphous transition metal oxide may remain in the device in the form of nanoparticles having amorphous structure. In this embodiment, the device containing the nanostructured amorphous transition metal oxide may include or may omit the protective layer(s) 116a, 116b, and 118, the UV stable electrolyte polymer, and the application of positive bias to the counter electrode.

Electrochromic responses of prepared nano structured transition metal oxide bronze materials (e.g., $Cs_xWO_3$, $Nb:TiO_2$, etc.) may be demonstrated by spectroelectrochemical measurements.

In various embodiments, the shape, size, and doping levels of nanostructured transition metal oxide bronzes may be tuned to further contribute to the spectral response by the device. For instance, the use of rod versus spherical nanostructures 112 may provide a wider level of porosity, which may enhance the switching kinetics. Further, a different range of dynamic plasmonic control may occur for nanostructures with multiple facets, such as at least 20 facets.

Various embodiments may also involve alternation of the nanostructures 112 that form the working electrode 104. For example, the nanostructures may be nanoparticles of various shapes, sizes and/or other characteristics that may influence the absorption of NIR and/or visible light radiation. In some embodiments, the nanostructures 112 may be isohedrons that have multiple facets, preferably at least 20 facets.

In some embodiments, the transition metal oxide bronze nanostructures 112 may be a combination of nanoparticles having a cubic unit cell crystal lattice ("cubic nanoparticles") and nanoparticles having a hexagonal unit cell crystal lattice ("hexagonal nanoparticles"). Each unit cell type nanoparticle contributes to the performance of the working electrode 104. For example, the working electrode 104 may include both cubic and hexagonal cesium doped tungsten oxide bronze nanoparticles.

For example, upon application of the first (i.e., lower absolute value) voltage described above, the hexagonal bronze nanostructures 112 may block NIR radiation having wavelengths in the range of around 800-1700 nm, with the peak absorption at the mid-NIR wavelength of around 1100 nm. The cubic bronze nanostructures 112 may block NIR radiation having wavelengths in the close-NIR range with the peak absorption of around 890 nm. The indium oxide based (including ITO) and/or zinc oxide based (including AZO) nanostructures 113 may be included in the working electrode 104 to block the higher wavelength IR radiation upon application of the first voltage. Thus, the cubic bronze and hexagonal bronze nanostructures may block respective close and mid-NIR radiation (e.g., using the Plasmon effect), while the nanostructures 113 may block the higher wavelength IR radiation.

Upon application of the second (i.e., higher absolute value) voltage described above, the cubic bronze nanostructures 112 may block visible and NIR radiation having wavelengths in the range of around 500-1500 nm, with the peak absorption at the close-NIR wavelength of around 890 nm (e.g., using the polaron effect). Optionally, the amorphous niobium oxide may also be added to the working electrode 104 to block the short wavelength visible radiation (e.g., 400 to 500 nm wavelength).

The cubic bronze nanostructures block visible radiation via the polaron effect at a lower applied voltage than the hexagonal bronze nanostructures. Thus, the second voltage may have an absolute value which is below the value at which the hexagonal bronze nanostructures block visible radiation via the polaron effect such that these nanostructures do not contribute to blocking of visible radiation. Alternatively, the second voltage may have an absolute value which is above the value at which the hexagonal bronze nanostructures block visible radiation via the polaron effect such that these nanostructures also contribute to blocking of visible radiation.

Embodiment nanoparticles that form the working electrode 104 may be around 4-6 nm in diameter, and may include 40 to 70 wt %, such as around 50 wt % cubic tungsten bronze nanostructures, 15 to 35 wt %, such as around 25 wt % hexagonal tungsten bronze nanostructures, and optionally 15 to 35 wt %, such as around 25 wt % ITO nanostructures. In some embodiments, in order to achieve color balancing as described above, the nanoparticles that form the working electrode 104 may optionally include around 5-10 wt % amorphous NbO nanostructures in place of cubic tungsten bronze nanostructures. In this embodiment, the device containing two types of bronze nanoparticles may include or may omit the protective layer(s) 116a, 116b, and 118, the UV stable electrolyte polymer, the application of positive bias to the counter electrode, and the amorphous niobium oxide.

In summary, the working electrode 104 may include one or more of the following components:
(a) metal oxide bronze nanostructures 112 having (i) a cubic or (ii) a combination of cubic and hexagonal unit cell lattice structure;
(b) protective (i) indium oxide based (including ITO) and/or zinc oxide based (including AZO) nanostructures 113;
(c) amorphous niobium oxide nanoparticles and/or web; and/or (d) additional nanostructures selected from undoped tungsten oxide, molybdenum oxide, titanium oxide, and/or vanadium oxide.

The counter electrode 108 may include one or more of the following components:
(a) passive electrode material selected from cerium(IV) oxide ($CeO_2$), titanium dioxide ($TiO_2$), cerium(III) vanadate ($CeVO_2$), indium(III) oxide ($In_2O_3$), tin-doped indium oxide, tin(II) oxide ($SnO_2$), manganese-doped tin oxide, antimony-doped tin oxide, zinc oxide (ZnO), aluminum-doped zinc oxide (AZO), iron(III) oxide ($Fe_2O_3$), and vanadium(V) oxide ($V_2O_5$);
(b) an active electrode material selected from chromium (III) oxide ($Cr_2O_3$), manganese dioxide ($MnO_2$), iron (II) oxide (FeO), cobalt oxide (CoO), nickel(II) oxide (NiO), rhodium(IV) oxide ($RhO_2$), and iridium(IV) oxide ($IrO_2$);
(c) amorphous nickel oxide nanoparticles and/or web; and/or
(d) conductivity enhancer nanoparticles selected from indium oxide, ITO, and zinc oxide.

While the various embodiments are described with respect to electrochromic windows, the embodiment methods, systems, and devices may also be used in materials for other types of smart windows. Such smart windows may include, but are not limited to, polymer-dispersed liquid crystals (PLDD), liquid crystal displays (LCDs), thermochromics, etc.

The following examples, experimental methods and results are not intended to limit the scope of the invention, but rather are provided merely for illustration of how nanoparticle characteristics may be utilized to further tune their electrochromic properties.

Localized surface plasmon resonance phenomena have recently been investigated in unconventional plasmonic materials such as metal oxide and chalcogenide semiconductors doped with high concentrations of free carriers. Colloidal nanocrystals of $Cs_xWO_3$ a tungsten bronze in which electronic charge carriers are introduced by interstitial doping, were synthesized. By using varying ratios of oleylamine to oleic acid three distinct shapes of these nanocrystals may be formed; hexagonal prisms, truncated cubes, and pseudo-spheres, which may exhibit strongly shape-dependent absorption features in the near infrared region. As shown in results, lower symmetry shapes may correlate with sharper plasmon resonance features and more distinct resonance peaks. The plasmon peak positions may also shift systematically with size and with the dielectric constant of the surrounding media, reminiscent of typical properties of plasmonic metal nanoparticles.

Controlling the size and geometry of metal nanocrystal surfaces may make it possible to tailor these particles to achieve diverse surface plasmon resonance (SPR) properties, allowing select nanoparticles to be tuned for use in sensors, electronic circuits, and photonic devices. The influence of particle geometry and size on optical properties is documented for many different metal nanoparticle shapes, including cubes, octahedra, rods, and stars. Semiconductor nanocrystals may offer similar synthetic control over size and geometry. The shape of such nanocrystals dramatically influences their absorption of NIR radiation. Changing the shape of a metallic particle alters the surface polarization, which influences how the surface interacts with light and thus the SPR. Particle size also has an effect on the optical properties of these materials, which is often described using Mie's solution to Maxwell's equation or the discrete dipole approximation.

Though exact solutions only exist for spheres, spheroids, and infinite cylinders, changing the nanoparticle size of a wide variety of shapes is known to influence the SPR. For example, increasing the aspect ratio in nanorods may cause the plasmon peak to red-shift in samples of gold as well as tungsten oxide. Increasing the size of silver triangles and plates may also result in a red-shift of the SPR.

Until recently, semiconductor nanocrystals had low free carrier concentrations and did not exhibit SPR phenomena. In metal oxide nanocrystals, substitutional doping with heterovalent metal ions has recently been used to introduce large free electron populations that support SPR in the infrared region. For example, this phenomenon has recently been demonstrated in tin-doped indium oxide, aluminum-doped zinc oxide, indium-doped cadmium oxide, and niobium-doped anatase titania. In copper chalcogenide nanocrystals large populations of free holes are generated by inducing copper deficiencies, which yields similar infrared plasmon absorption features. However, these defect-doping strategies are limited with respect to the achievable carrier concentrations and therefore the spectral tuning range of the SPR.

Tungsten oxide of the formula $WO_{3-x}$, ($x<0.33$) is a reduced form of tungsten trioxide ($WO_3$) that is widely understood to contain oxygen vacancies within the crystal lattice. These oxygen vacancies create changes in the charge states of tungsten, which influence absorption properties and can give rise to infrared SPR phenomena. However, the crystal structure of $WO_3$ may offer additional opportunity for introducing free electrons beyond the concentrations typically achievable by defect mechanisms. Unlike substitutional doping, in which a doping atom replaces an atom within the crystal lattice, interstitial doping allows a new atom to be incorporated within the crystal structure as a result of atomic vacancies or defects within the lattice. As a result, it is possible for the nanocrystal to have a higher concentration of free electrons. The crystal structures of $WO_3$ and $WO_{3-x}$ are composed of $WO_6$ octahedra as the basic structural unit, creating one-dimensional tunnels of variable sizes and shapes. These tunnels are highly selective for cations with ionic radii of 1.2 and 1.7 Å, so they are ideal for the incorporation of cesium atoms with ionic radii of 1.69 Å. Such cesium-doped tungsten oxides are known to have exceptionally strong NIR radiation absorption because the cesium may act as an interstitial dopant, introducing a far higher population of free electrons than is achievable using lattice-site defects including heterovalent metals or vacancies.

A class of interstitially doped tungsten oxides known as tungsten bronze has the formula $M_xWO_3$, where M may be, without limitation, $Li^+$, $Na^+$, $Cs^+$, or $Rb^+$. Tungsten bronze materials retain a high transmittance of visible light while exhibiting high absorption of NIR radiation, making them ideal candidates for spectrally-selective optical devices, such as electrochromic smart windows. Various methods have been used to synthesize $M_xWO_3$, such as solid-state synthesis, thermal plasma synthesis, and chemical transport. Various embodiment methods may involve colloidal synthesis of tungsten bronze, which may show how shape evolution from pseudo-spheres to truncated cubes to hexagonal prisms of the same $Cs_xWO_3$ crystal structure influences the SPR.

Figure 1B:
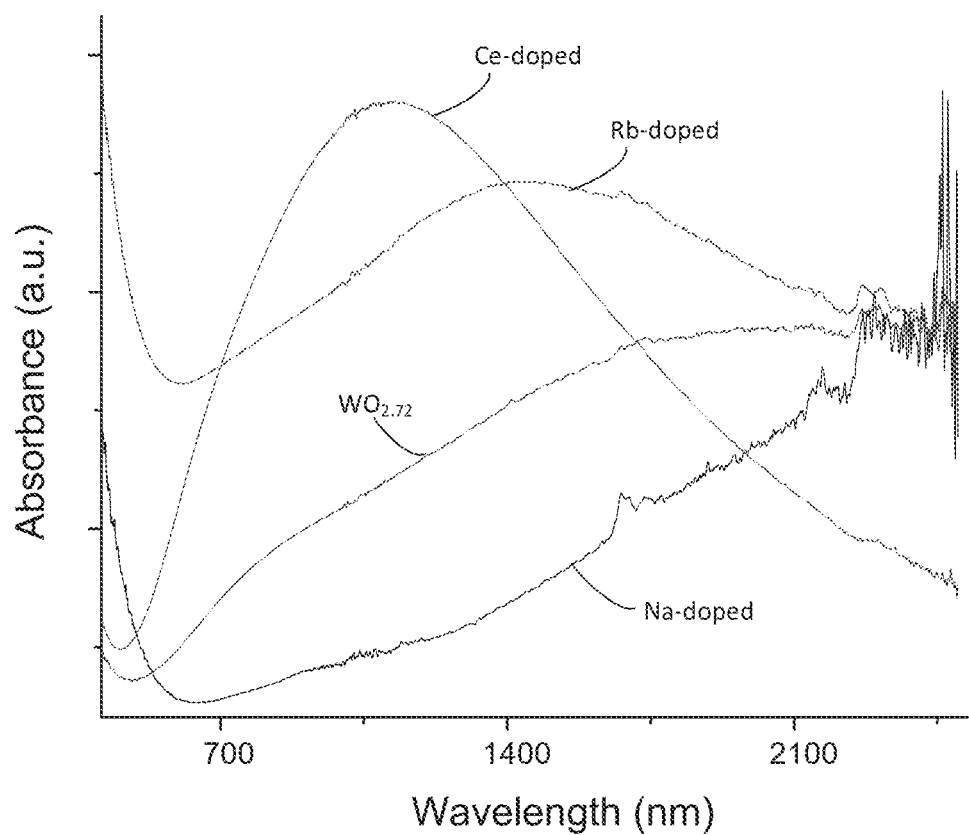
FIG. 1B is a graph showing absorbance spectra of various doped $WO_{2.72}$ compositions.

X-ray diffraction (XRD) confirms that these synthetic procedures may be translated to synthesize $Rb_xWO_3$. As shown in FIGS. 1A and 1B, using cerium and sodium as dopants may also influence the NIR optical spectra. FIG. 1A illustrates a comparison between measured XRD pattern data for rubidium doped tungsten oxide ($Rb_{0.29}WO_3$) nanocrystals that were synthesized and XRD pattern data published in the Inorganic Crystal Structure Database (ICSD) as ICSD: 1716. FIG. 1A also includes an inset transmission electron microscopy (TEM) image of the synthesized $Rb_{0.29}WO_3$ nanocrystals. FIG. 1B shows the absorbance spectra of a tungsten oxide material ($WO_{2.72}$), the structure of which is based on XRD pattern data, and of the tungsten oxide material doped with rubidium, sodium, and cerium.

The preferred incorporated ions, the size of cesium and the exceptional absorption of radiation by tungsten oxide doped with cesium, indicate that $Cs_xWO_3$ may be a preferred tungsten bronze. The following procedures describe methods for creating $Cs_xWO_3$ and analyzing its geometry, size, and dielectric environment for systematically manipulating optical properties.

Synthesis of $Cs_xWO_3$

In a 50 mL three neck flask equipped with an air-cooled condenser, under nitrogen flow, 0.20 mmol (66 mg) tungsten (IV) chloride ($WCl_4$) (Strem Chemical), 0.12 mmol (20 mg) cesium chloride (CsCl) (Aldrich), 0.60 mmol (0.20 mL) oleylamine (OlAm) (Aldrich), and 19.0 mmol (5.2 mL) oleic acid (OlAc) (Sigma-Aldrich) were stirred at 300° C. for 120 minutes and resulted in a blue-green solution. The reaction was cooled to room temperature and 0.5 mL toluene (Aldrich) was added to the blue-green solution. A 1:1 ratio of acetone to reaction mixture precipitated the product and the mixture was centrifuged at 3800 rpm for ten minutes. The blue-green precipitate was redispersed in 0.5 mL toluene and precipitated again with 1 mL acetone (BDH). Centrifuging for an additional ten minutes at 3800 rpm resulted in clean nanocrystals of $Cs_xWO_3$. The reaction yields a qualitatively similar product over a range of CsCl (0.05-0.18 mmol) while varying the amounts of OlAm and OlAc results in three different nanocrystalline shapes (pseudo-spheres, 1.5 mmol OlAm and 3.1-7.9 mmol OlAc; truncated cubes, 0.50-1.0 mmol OlAm and 19.0 mmol OlAc; hexagonal prisms, 0.60-1.5 mmol OlAm and 19.0-31.7 mmol OlAc).

Synthesis of $WO_{2.72}$

In a 50 mL, three-neck flask equipped with an air-cooled condenser, under nitrogen flow, 0.20 mmol (66 mg) $WCl_4$, 19 mmol (1.2 mL) OlAm, and 1.5 mmol (3.5 mL) OlAc were stirred at 300° C. for 120 minutes. The product was precipitated with 12 mL acetone and centrifuged for 15 minutes at 3800 rpm. The blue pellet was redispersed in 0.5 mL toluene and precipitated once more with 2 mL acetone. Centrifuging for 20 minutes at 3800 rpm resulted in a clean, dark blue product with nanorod morphology.

Results

XRD patterns were collected on a Bruker D8-Discover X-ray diffractometer equipped with a GADDS area detector and operated at 40 kV and 20 mA at the wavelength of Cu $K_\alpha$ 1.54 Å. Optical spectra were collected on an ASD LabSpec Pro and high resolution TEM images were collected on a JEOL 2100 operated at an accelerating voltage of 200 kV. XRD modeling was performed using diffraction data for $Cs_{0x}WO_3$ ($P6_322$ space group) in CrystalMaker and Le Bail refinement was performed using the Generalized Structure Analysis System (GSAS). X-ray Photoelectron Spectroscopy (XPS) measurements were performed using a Physical Electronics PHI 5400 equipped with an aluminum x-ray source. All XPS spectra were calibrated to the C1s peak at 284.8 eV in order to correct for possible charging and high resolution spectra of the Cs $3d_{5/2}$ and W 4f peaks were analyzed using the CasaXPS software package. Elemental analysis using Flame Atomic Absorption (FLAA) and Inductively Coupled Plasma Optical Emission Spectrometry (ICP-OES) was performed by Galbraith Laboratories, Incorporated. Optical spectra were collected in tetrachloroethylene (TCE) (Sigma-Aldrich).

To evaluate the shape of the resulting nanocrystals, samples were surveyed by low-resolution TEM.

Figure 1C:
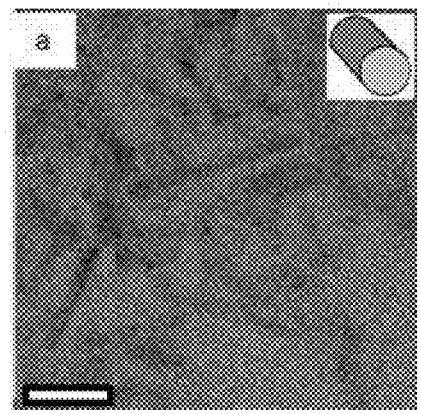
FIGS. 1C-1F are TEM images of different shapes of nanostructures for $WO_{2.72}$ and/or $Cs_{0.29}WO_3$ samples.
Figure 1D:
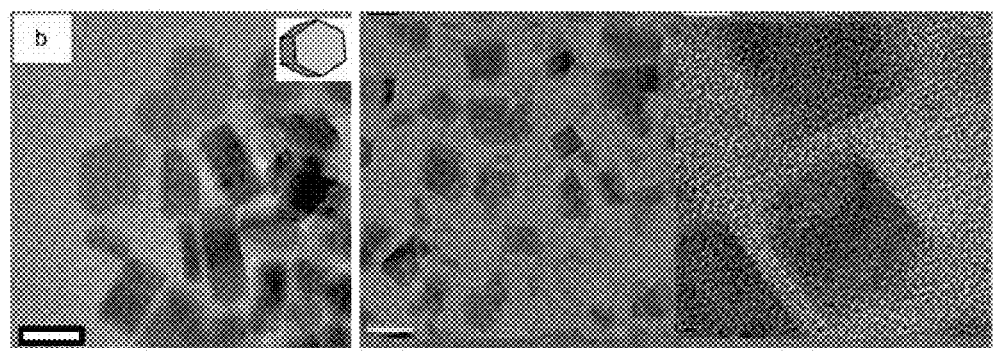
Figure 1E:
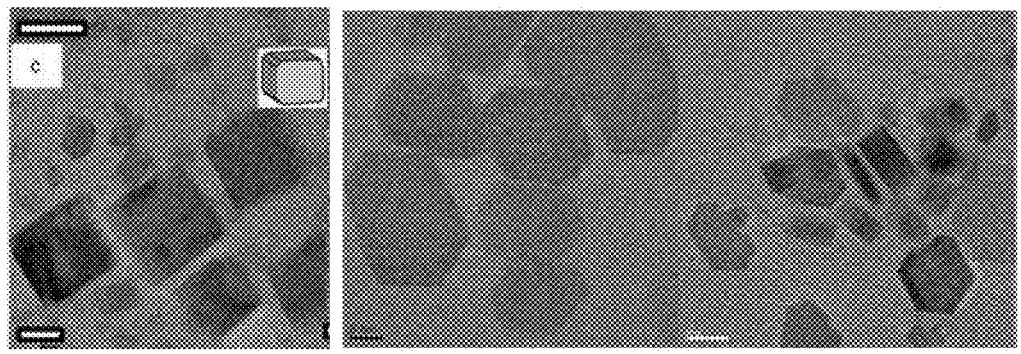
Figure 1F:
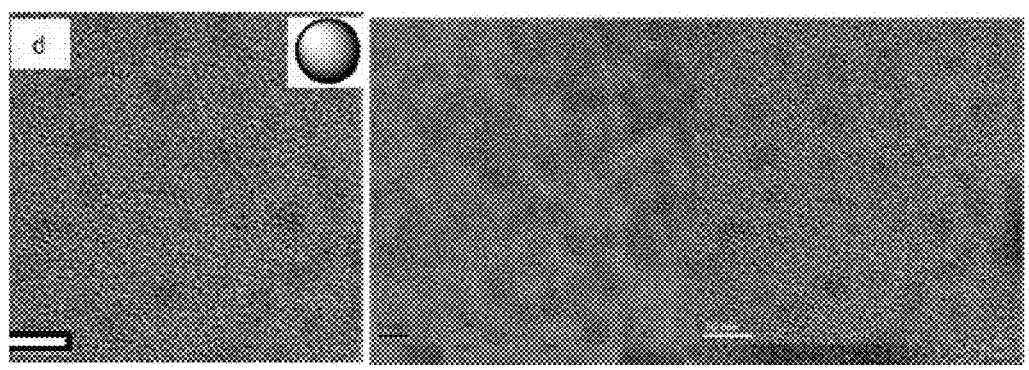

FIG. 1C is a TEM image of $WO_{2.72}$ nanorods that were produced absent any cesium doping, with an inset illustrated rod shape. It has been previously observed in $CeO_2$ and $Re_2O_3$ that changing the ratio of OlAc to OlAm provides shape control as a result of different binding capabilities of the ligands and passivation into the surface of the nanocrystal. Similarly, when cesium was incorporated, increasing the amount of OlAc produces more faceted shapes. As shown in FIGS. 1D-1F, different shapes were achieved depending on the ratio of OlAc to OlAm. Specifically, FIGS. 1D-1F are TEM images of $Cs_xWO_3$ hexagonal prisms, cubes and pseudo-spheres, respectively, each with a corresponding inset illustrated shape. Hexagonal prisms result when the OlAc:OlAm ratio is 12.5-31, truncated cubes when the ratio is 5.2-12.5, and pseudo-spheres when the ratio is 2.1-5.2.

Figure 1G:
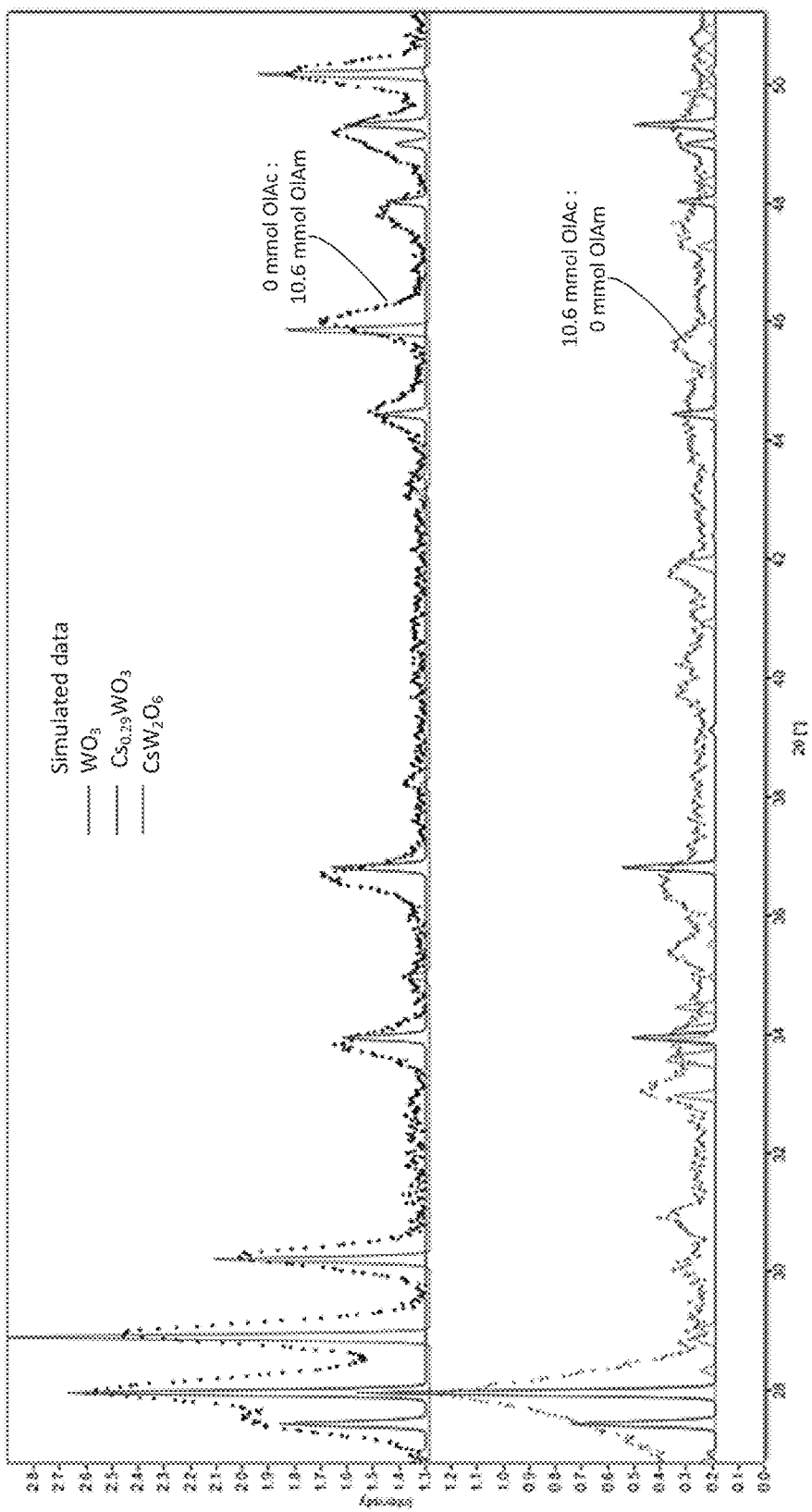
FIG. 1G is a graph showing x-ray diffraction patterns for various synthesized samples and simulated compounds.
Figure 1H:
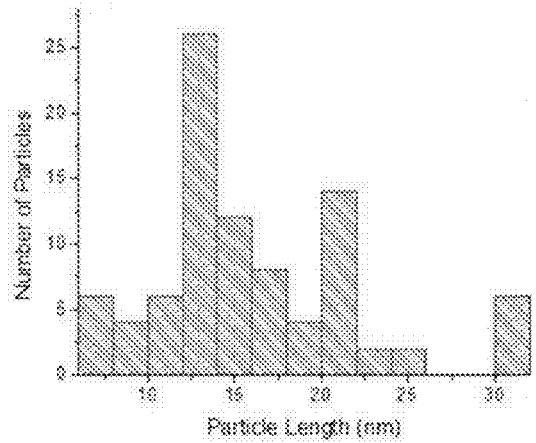
FIGS. 1H-1K are size histograms from bright field TEM images including 50-100 particles each of different shapes for various samples.
Figure 1I:
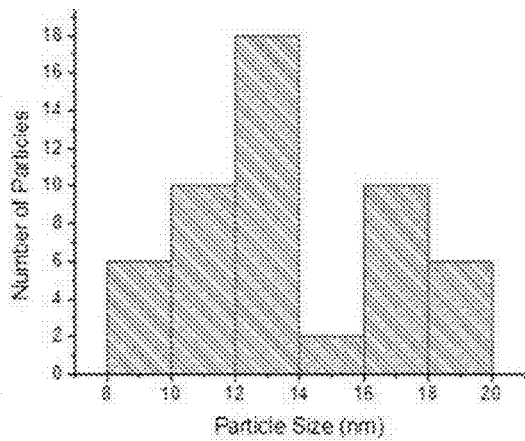
Figure 1J:
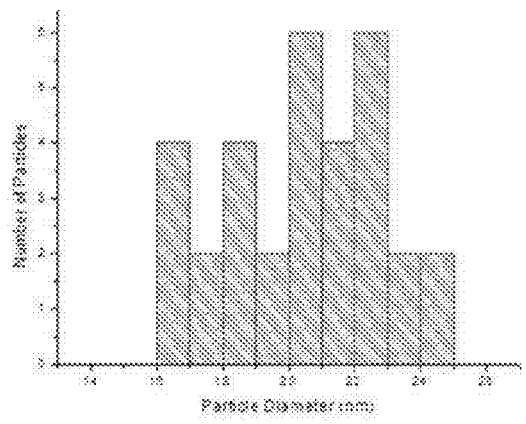
Figure 1K:
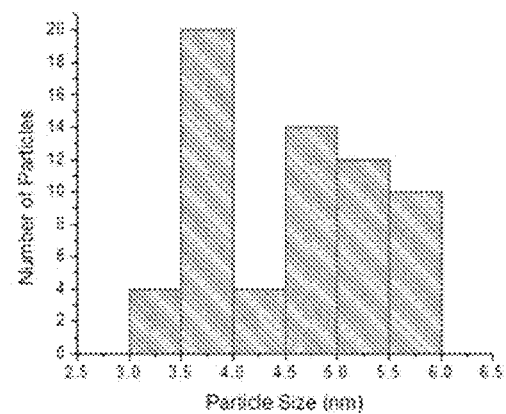

FIG. 1G illustrates XRD patterns for samples synthesized using 0 mmol OlAc: 10.6 mmol OlAm and 10.6 mmol OlAc:0 mmol OlAm with simulated data for $Cs_{0.29}WO_3$ (ICSD: 56223), $CsW_2O_6$ [$Cs_{0.5}WO_3$] (ICSD: 72634.), and $WO_3$(ICSD: 32001), which are not phase pure at these extremes of the surfactant composition. As shown by the data, an OlAc:OlAm ratio of less than 2.1 or greater than 31.3 results in mixed crystalline phases by XRD.

Particle sizes were determined by TEM to be 16.0±5.8 nm for the undoped $WO_{2.72}$ rods (measuring the long dimension), 4.6±0.79 nm for the $Cs_xWO_3$ pseudo-spheres, 20.4±2.4 nm for truncated cubes, and 13.2±3.0 nm for hexagonal prisms. The truncated cube particles included a variety of smaller sizes (under 12 nm) besides the primary product that were omitted from size measurements.

Figure 1L:
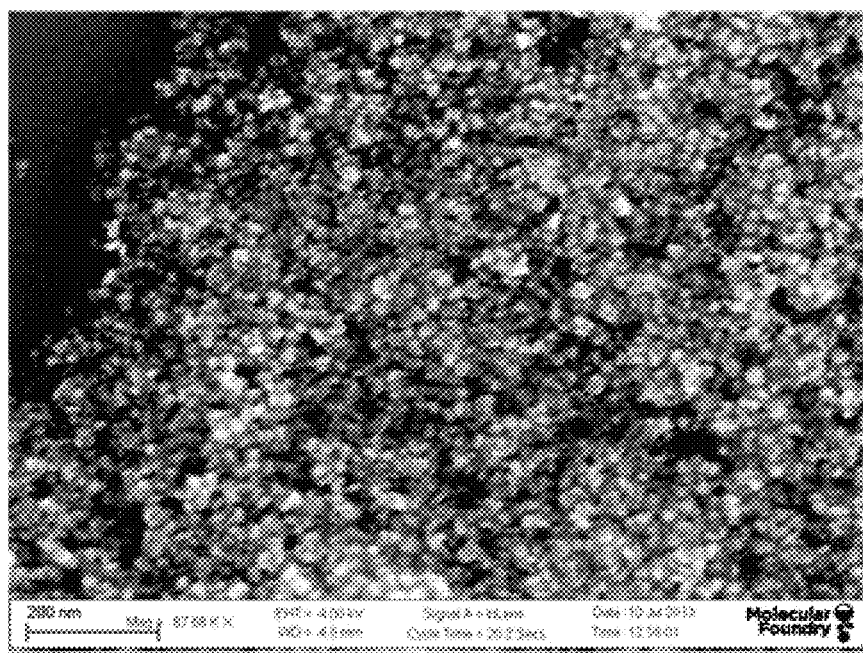
FIG. 1L is a scanning electron microscopy (SEM) image of hexagonal prisms for a sample.

FIG. 1H-1K are size histograms showing data collected from bright field TEM images including 50-100 particles each of undoped $WO_{2.72}$ rods, $Cs_{0.29}WO_3$ hexagonal prisms, $Cs_{0.29}WO_3$ truncated cubes, and $Cs_{0.29}WO_3$ pseudo-spheres, respectively. FIG. 1L is a scanning electron microscopy (SEM) image of $Cs_{0.29}WO_3$ hexagonal prisms.

Figure 2A:
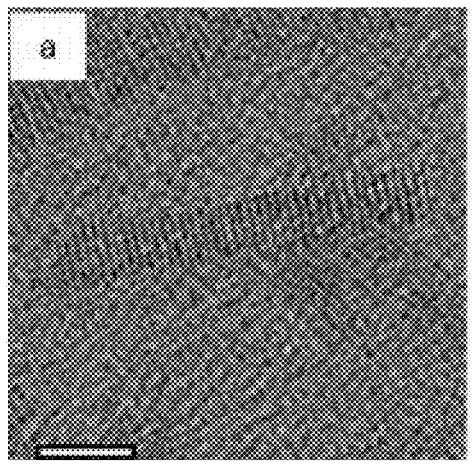
FIGS. 2A-2D are TEM images of different shapes of nanostructures for various samples.
Figure 2B:
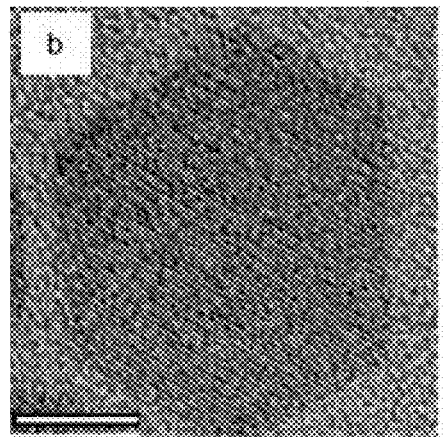
Figure 2C:
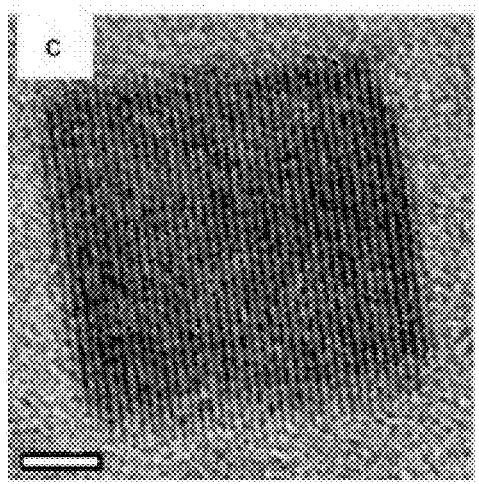
Figure 2D:
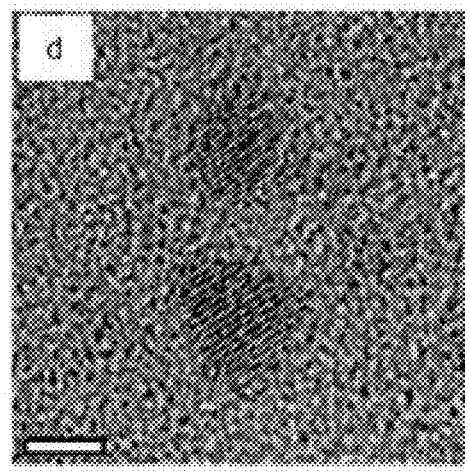

The faceted shapes observed by TEM suggest crystalline particles, and were confirmed to be single crystals by high resolution TEM as shown in FIGS. 2A-2D. FIG. 2A is a high resolution lattice-resolved TEM image of undoped $WO_{2.72}$ rods with a [−2 4 1] zone axis. FIG. 2B is a high resolution lattice-resolved TEM image of a $Cs_{0.29}WO_3$ hexagonal prism viewed perpendicular to its largest face with a [−1 0 1] zone axis. FIG. 2C is a high resolution lattice-resolved TEM image of a truncated cube with a [1 0 0] zone axis. FIG. 2D is a high resolution lattice-resolved TEM image of pseudo-spheres with a [1 0 0] zone axis.

Figure 2E:
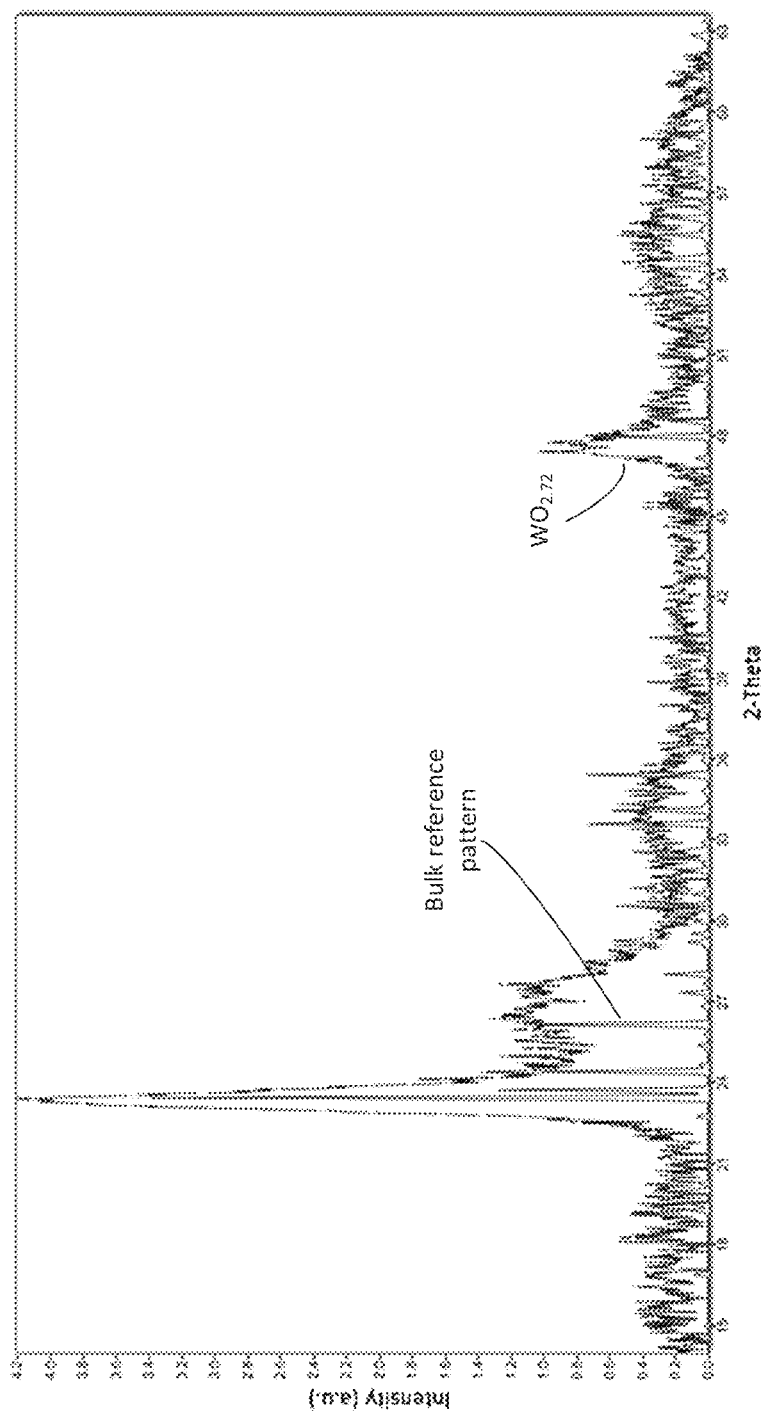
FIG. 2E is a graph showing x-ray diffraction patterns of a sample and of bulk reference pattern data.

FIG. 2E is an XRD pattern for $WO_{2.72}$ compared to a bulk reference pattern (ICSD: 24731). As shown, undoped tungsten oxide is consistent with monoclinic $WO_{2.72}$, supporting the assignment of the composition as $WO_{3-x}$ where x is 0.28. The $WO_{3-x}$ structure is a reduced form of cubic $WO_3$ that contains oxygen vacancies within the crystal lattice. These oxygen vacancies create a distribution of W formal oxidation states between 6+, 5+, and 4+, and the alterations in charge state are responsible for changes in absorption properties compared to $WO_3$. This is apparent by the dark blue color of the nanorods, which results from the tail of the strong infrared (IR) radiation crossing into the red edge of the visible spectrum.

To better understand how NIR radiation plasmonic characteristics can emerge in interstitially doped tungsten bronze nanocrystals, it is useful to consider the crystallographic implications of doping tungsten oxide. $WO_3$ may be described as a modification of the perovskite-type $ABO_3$ lattice in which the B site is occupied by W atoms and the A site is unoccupied, as shown in FIG. 3A, which is a ball-and-stick model of $WO_3$. Oxygen vacancies within the lattice result in the formation of $WO_6$ octahedron as the basic structural unit. FIG. 3B is a polyhedral model of $WO_3$, which shows that these oxygen vacancies are responsible for creating tunnels within the crystal structure of $WO_{2.72}$. FIG. 3C is a polyhedral model of $WO_{2.72}$ showing that additional oxygen vacancies distort the $WO_6$ octahedral units and the local environments of the tungsten ions become heterogeneous. Doping with $Cs^+$ ions instead results in occupation of the open channels in the $WO_3$ structure to form $Cs_xWO_3$. This is shown in FIG. 3D, which is a polyhedral model of $Cs_xWO_3$.

Figure 3E:
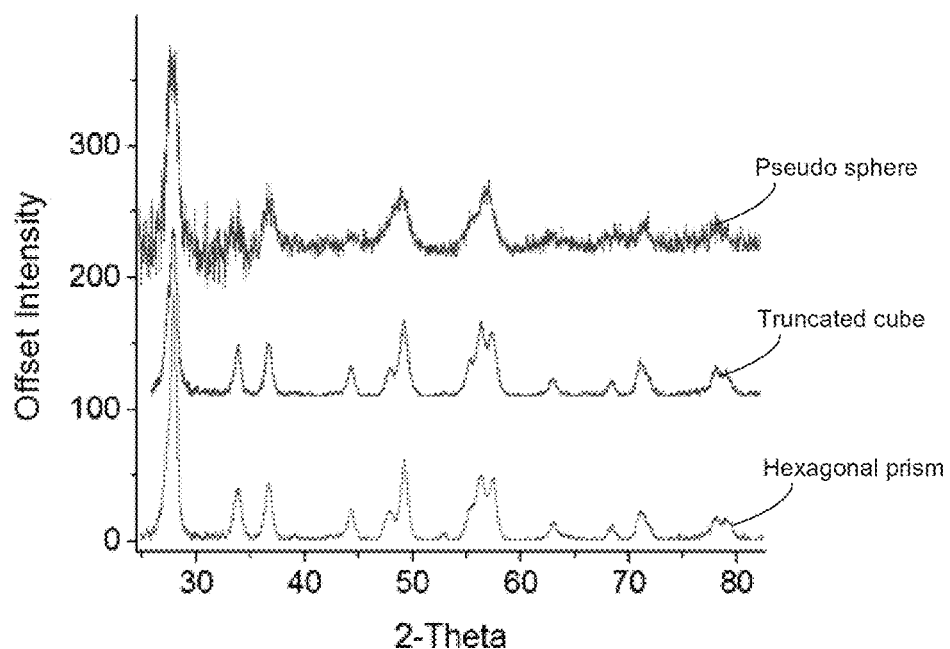
FIGS. 3E-3G are graphs showing normalized x-ray diffraction patterns of a sample having various shapes.
Figure 3F:
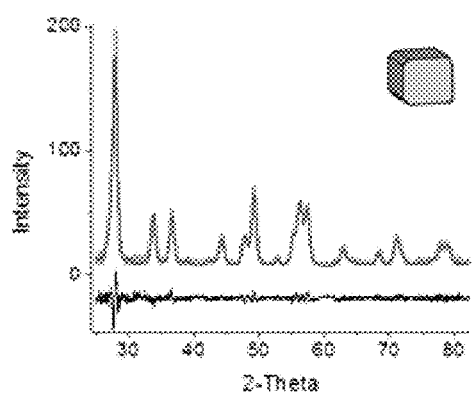
Figure 3G:
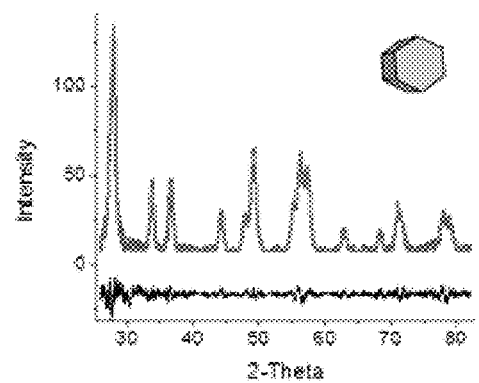

FIG. 3E shows XRD patterns for $Cs_{0.29}WO_3$ spheres, truncated cubes, and hexagonal prisms. The three shapes of cesium tungsten bronze (i.e., hexagonal prism, truncated cube, and pseudo-sphere) were determined by XRD to be $Cs_{0.29}WO_3$, consistent with a $Cs_{0.29}WO_3$ reference pattern. XRD patterns were refined by Le Bail fitting in the GSAS suite for the hexagonal prisms (Rp 0.2091; wRp 0.1101) and truncated cubes (Rp 0.1485; wRp 0.0984). FIG. 3F is a Le Bail fit with residual plot of a 20.4±2.4 nm truncated cubes. FIG. 3G is a Le Bail fit with residual plot of 13.2±3.0 nm hexagonal prisms. The unit cell increases slightly in size when comparing the truncated cube to the hexagonal prism, with respective increases from 7.395 Å to 7.404 Å for the pattern shown in FIGS. 3E and 3F, and 7.606 Å to 7.615 Å for the pattern shown in FIG. 3G.

Figure 3I:
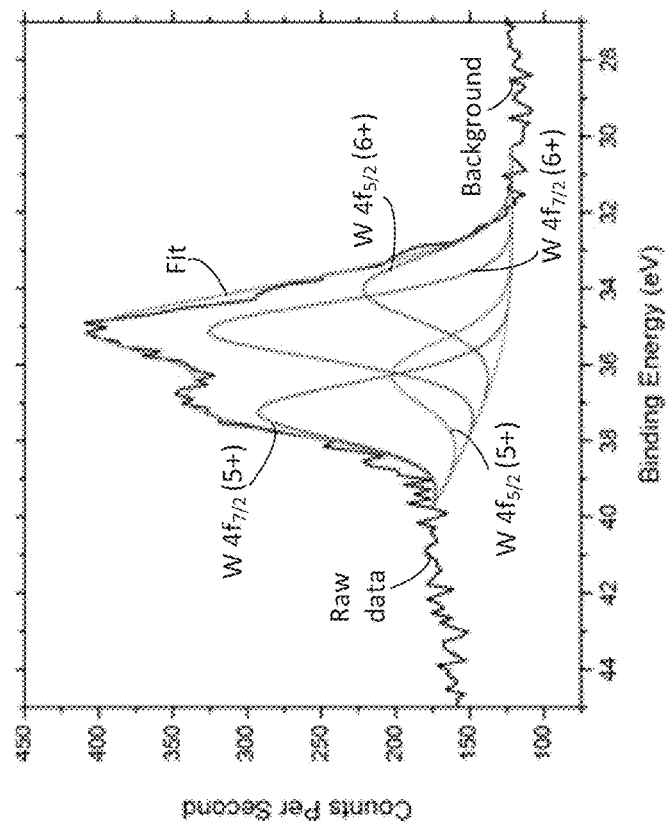
FIGS. 3I and 3J are high resolution scans of tungsten $4f_{7/2}$ and $4f_{5/2}$ peaks and cesium $3d_{5/2}$ and $3d_{3/2}$ peaks.
Figure 3H:
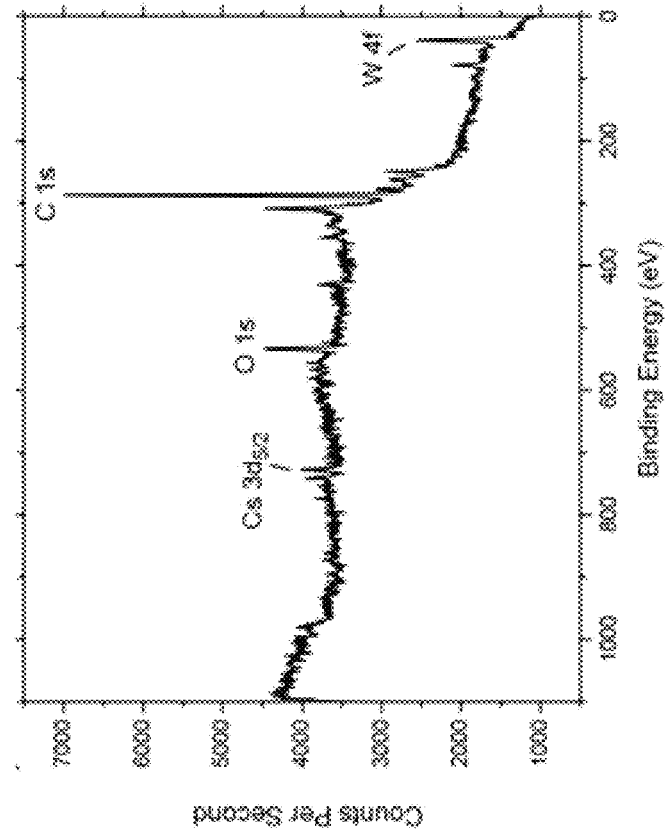
FIG. 3H is a graph showing results of an x-ray photoelectron spectroscopy (XPS) survey scan for samples of the embodiments.
Figures 3J, 3K:
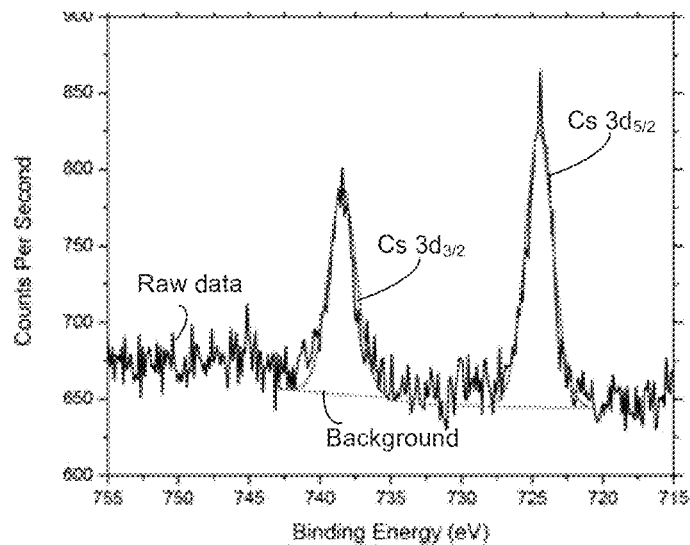
FIG. 3K is a table showing peak fit parameters and compositions for compositions of the embodiments.

Though XRD confirms that Cs is incorporated within the crystal structure, further analysis was performed to determine how the Cs ions are distributed throughout the nanocrystals. Specifically, doping near the surface of the nanocrystals of $Cs_{0.29}WO_3$ was characterized by XPS, which is shown in a survey scan in FIG. 3H. FIGS. 3I and 3J are high resolution scans of $Cs_{0.29}WO_3$ showing normalized peak area measurements for tungsten and cesium respectively. The surface composition was dominated by oxygen and carbon, with a metals composition determined to be 18.2% Cs and 81.7% W from the normalized peak area measurements (i.e. x=0.15 in $Cs_xWO_3$). By contrast, the average doping content analysis was determined by Inductively coupled plasma atomic emission spectroscopy (ICP-OES) and flame atomic absorption (FLAA) spectroscopy to be x=0.09. These results suggest that the Cs distribution is radially non-uniform with higher doping levels near the surface of the nanocrystals. FIG. 3K is a table detailing peak fit parameters and composition analysis for $Cs_{0.29}WO_3$.

To investigate whether the NIR radiation absorbance of synthesized $Cs_xWO_3$ nanocrystals can be ascribed to SPR or to absorption by local defect states, shift in the absorbance peak in solvents of varying refractive index (RI) was observed. The SPR is known to be sensitive to the RI of the surrounding environment, where increasing the RI of the solvent has a linear effect on the wavelength of the plasmon peak. Optical spectra of the same hexagonal prism sample of $Cs_{0c}WO_3$ were collected in solvents TCE, dimethylformamide (DMF) (Aldrich), and acetonitrile (MeCN), which have respective RIs of 1.51, 1.43, and 1.35.

FIG. 4A illustrates the absorbance spectra of the hexagonal prism $Cs_{0.29}WO_3$ in these solvents, showing two distinct absorbance peaks. While the longer wavelength peak is too broad to draw any definitive conclusions as to the peak shift, the there is an obvious red-shift in the shorter wavelength peak as RI changes. FIG. 4B is a magnification of the shorter wavelength absorbance peak for the hexagonal prism $Cs_{0.29}WO_3$ in TCE, DMF and MeCN. FIG. 4C is a plot showing solvent RI versus wavelength for the hexagonal prism $Cs_{0.29}WO_3$. The data show an obvious and systematic shift of the peak position to longer wavelengths as the RI of the solvent increases, which supports the assignment of this shorter wavelength peak as plasmon resonance absorption though it remains to be definitively ascertained whether the longer wavelength peak is also plasmonic in nature. Mie's solution to Maxwell's equation predicts a stronger dependence of the peak wavelength on RI than was observed experimentally. The effect of refractive index (RI) of the host medium on SPR peak position for a nano-sized particle, from the Mie theory, can be expressed as:

$$C_{ext} = \frac{4\pi}{k^2} \text{Re}\left( i \left( \frac{\varepsilon - \varepsilon_{med}}{\varepsilon + 2\varepsilon_{med}} \right) \right), \quad \text{(Eq. 1)}$$

where $C_{ext}$ represents extinction cross section of a spherical particle, k is $2\pi n_{med}/\lambda$ (where $n_{med}$ represents refractive index of medium), $\varepsilon$ represents particle dielectric function, and $\varepsilon_{med}$ represents dielectric function of medium. From Equation 1, $$Re(\varepsilon + 2\varepsilon_{med}) \to 0 \quad \text{(Eq. 2)}.$$

For a spherical particle, from the free electron Drude model $$\text{Re}(\varepsilon) = 1 - \frac{\omega_p^2}{\omega^2 + \gamma^2}, \quad \text{(Eq. 3)}$$

where $\omega_p$ represents the plasmon frequency of the bulk metal, $\omega$ represents frequency of incident light and $\gamma$ represents damping frequency of bulk material.

Since the peak frequencies in the examples herein lie in the visible spectral range, $\omega \gg \gamma$, equation 3 can be simplified to:

$$\text{Re}(\varepsilon) = 1 - \frac{\omega_p^2}{\omega^2}. \quad \text{(Eq. 4)}$$

Substituting Equation 1 into Equation 4 provides:

$$\omega = \frac{\omega_p}{\sqrt{2\varepsilon_{med} + 1}}. \quad \text{(Eq. 5)}.$$

Substituting $\varepsilon_{med} = \eta_{med}^2$, and within a small range of RI, Equation 5 simplifies to $$\lambda = \sqrt{2}\lambda_p \eta \quad \text{(Eq. 6)},$$

where $\lambda$ represents peak wavelength, $\lambda_p$ represents bulk plasmon wavelength and $\eta$ represents refractive index. As shown by Equation 6, for nano-sized spherical particle within a small range of RI, peak wavelength is linearly dependent on RI of the medium.

Figure 4D:
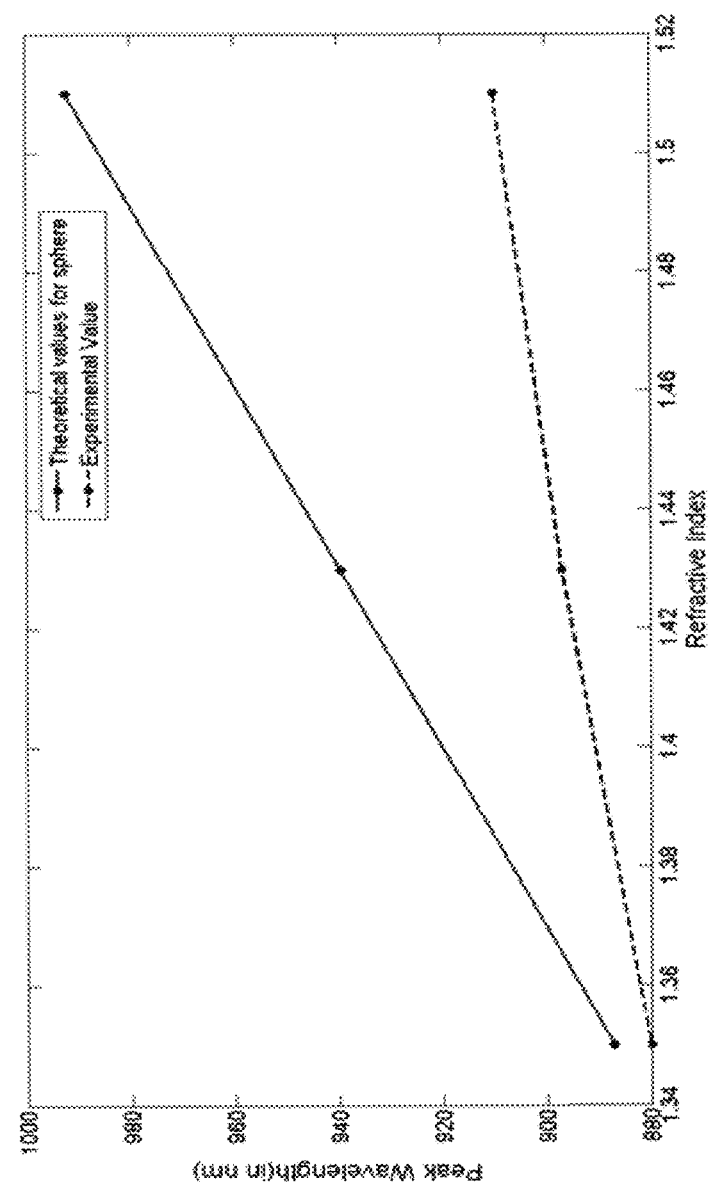
FIG. 4D is a plot showing experimental data and theoretical predictions for SPR peak position versus refractive index of spherical nanoparticles.

FIG. 4D shows SPR peak position of experimental data and the theoretical prediction using Mie's solution to Maxwell's equation plotted against the RI of the surround medium (theory) or solvent (experiment). The data show that Mie's solution to Maxwell's equation predicts a stronger dependence of the peak wavelength on RI than was observed experimentally. This difference can be ascribed to the non-spherical shape of the particles as well as the contribution of the ligands attached to the surface of the nanocrystals.

The connection between SPR and particle shape has been well studied for metal nanoparticles. For example, a wide range of gold nanoparticle shapes have been studied, including stars, dumbbells, and triangular and hexagonal plates. The influence of shape on SPR has also been studied in silver octahedra, rods, triangles, and plates. Recently, the possibility for doped semiconductor nanocrystals to exhibit shape-dependent plasmonic properties has been investigated. Results for vacancy-doped copper chalcogenide nanocrystals are conflicting. $Cu_{2-x}S$ is known to have tunable plasmons, and changing the aspect ratio of semiconductor $Cu_{2-x}S$ nanodiscs has a strong influence on the absorption of radiation in the NIR spectral region. By contrast, Kriegel et al. found that the SPR of $Cu_{2-x}Te$ nanospheres, rods, and tetrapods have only a weak shape dependence (see L. Kriegel et al., ACS Nano 2013, 7, 4367-4377).

Changing the aspect ratio of phosphorous-doped silicon nanowires was also reported to yield a shape-dependent SPR. In the case of substitutionally-doped metal oxides, Gordon et al. have recently published clear evidence of shape dependent SPR in indium-doped cadmium oxide spheres and octahedral (see T. R. Gordon et al., Nano Lett. 2013, 13, 2857-2863).

Noguez discusses SPRs for a series of silver nanoparticle shapes, explaining how the optical peaks change when increasing the number of truncations of a cube (see C. Noguez, J. Phys. Chem C., 2007, 111, 3806-3819). That is, truncating a cube results in shapes with different numbers of planes or faces; cube (6 faces), truncated cube (14 faces), icosohedron (20 faces), and sphere (infinite faces). As the number of faces on the particle increases, three important trends are apparent in the resonance spectra. First, the main/largest resonance will blue-shift. Second, the peaks with smaller wavelength resonances move closer to the main resonance and can be hidden. Third, the width of the main resonance peak increases.

Figure 5A:
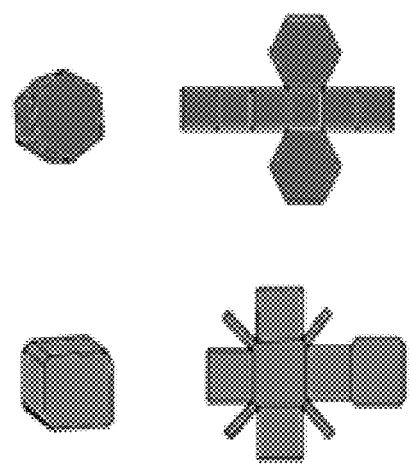
FIG. 5A is an illustration of different faceted shapes of nanocrystals and their flat projections that may exist in the various embodiments.

Trends in optical spectra of $Cs_xWO_3$ nanocrystals were observed by analogous deconstruction of their idealized shapes into the number of faces. The nanocrystals described herein exhibit the same three trends that Noguez identified for silver nanoparticles, highlighting the similarity of physics between metals and doped semiconductors when looking at plasmons. FIG. 5A shows flat projections of a hexagonal prism and truncated cube, with eight and ten faces respectively (a sphere has an infinite number of faces so is not depicted).

Figure 5B:
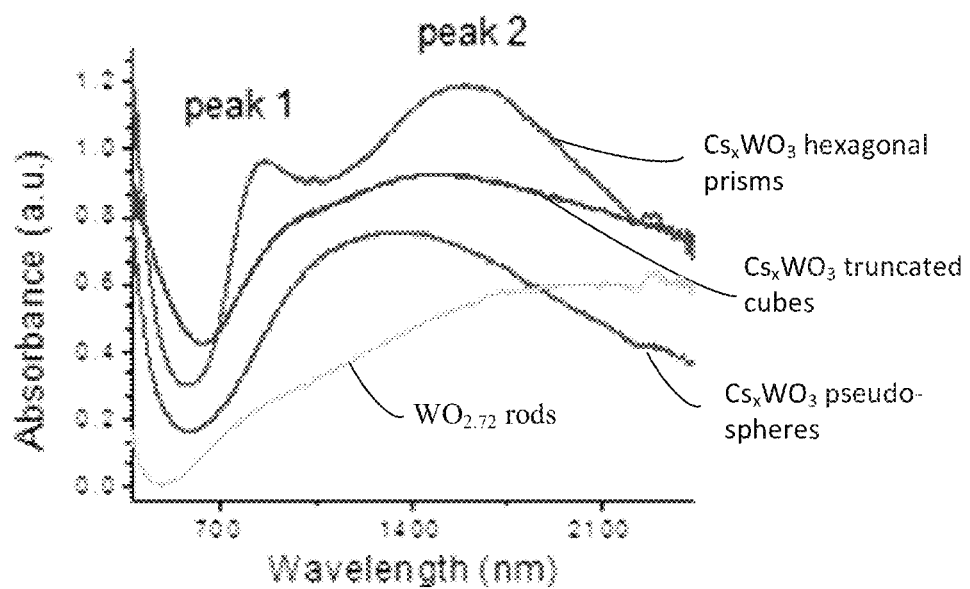
FIG. 5B is a graph showing absorbance spectra for samples having different shapes in the various embodiments.

FIG. 5B shows the absorbance spectra of $Cs_xWO_3$ hexagonal prisms (top line), truncated cubes (second from top line), pseudo-spheres (second from bottom line), and $WO_{2.72}$ rods (bottom line), with spectra offset for clarity.

The hexagonal prism has two distinct absorbance peaks, a less intense peak at 860 nm (peak 1) and a more intense peak at 1602 nm (peak 2). As the number of faces on the nanocrystal surface increases from eight (hexagonal prism) to ten (truncated cube) to infinity (sphere), the optical peaks reduce from two obvious, distinct peaks to one. This is observed as the number of faces increase with a red-shift of peak 1 (respectively 860 nm, 990 nm, 1315 nm) and a blue-shift of peak 2 (respectively 1602 nm, 1506 nm, and 1315 nm). As the trend of increasing the faces of the particles progresses, peak 1 becomes less visible. In effect, peak 1 in the pseudo-sphere sample becomes indistinguishable from peak 2, so that both resonances occur under the envelope of one broader peak.

These shape dependent absorption spectra are compared to the spectra of $WO_{2.72}$ nanorods in FIG. 5B. The defect structure of oxygen-vacancy doped tungsten oxide creates strong electron-phonon interactions which activate polarons to absorb visible and NIR radiation. FIG. 5B shows the absorbance spectra of $WO_{2.72}$ with a broad peak at approximately 2100 nm. This spectrum is sharply contrasted with those that result from doping with cesium, which changes the crystal structure from monoclinic to hexagonal. Adachi has suggested that peak 2 in $Cs_xWO_3$ is a shift of the polaron seen in $WO_{2.72}$ (see K. Adachi et al., *J. Mater. Res.* 2012, 27, 965-970).

However, given the change in crystal structure and increase in carrier density in $Cs_xWO_3$, it is possible that both NIR radiation absorbance peaks in $Cs_xWO_3$ are a result of the SPR of free electrons in the conduction band. Indeed, the carrier concentration in the interstitially doped $Cs_xWO_3$ nanocrystals appears to be substantially higher than is observed in the literature on plasmonic semiconductor nanocrystals. Commonly studied plasmonic metals such as silver, gold, and copper have carrier densities in the range of $1022$-$1023$ $cm^{-3}$. Doped plasmonic materials have substantially lower carrier densities, such as $Cu_{1.85}Se$ with a carrier density of $3.0\times1021$ $cm^{-3}$ and indium tin oxide with a density of $1.9\times1021$ $cm^{-3}$. The carrier density for the synthesized faceted $Cs_xWO_3$ particles cannot be rigorously derived from their optical spectra without detailed electromagnetic modeling, but it was approximated by Drude theory to be as high as $5\times1021$ $cm^{-3}$.

Figure 6A:
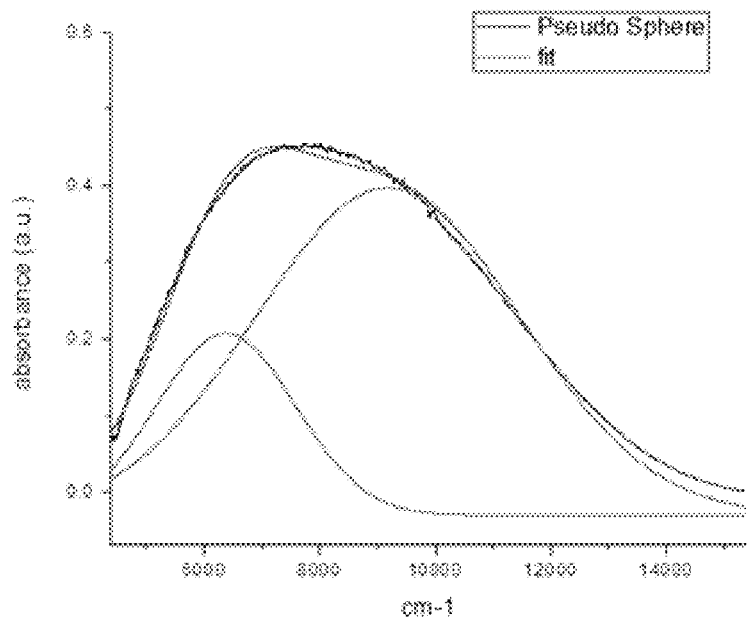
FIG. 6A is a graph showing absorbance spectra for peak fit of pseudo-sphere absorbance spectra including calculated parameters, statistics, and calculated carrier density.

FIG. 6A illustrates Gaussian peak fit of pseudo sphere absorbance spectra including calculated parameters, statistics, and calculated carrier density. FIG. 6B shows the absorbance spectra of a $Cs_xWO_3$ pseudo-sphere sample, with aliquots of the same reaction taken at 5 mins (bottom line), 30 mins (middle line), and 60 mins (top line). As the reaction progresses the particle size increases from roughly 3 nm to 5 nm, and there is an obvious red-shift of the resonance peak from 1081 nm at 5 min to 1350 nm at 60 min. FIG. 6C shows the absorbance spectra of a $Cs_xWO_3$ hexagonal prism sample, with aliquots of the same reaction taken at 30 mins (bottom line) and 90 mins (top line). As the reaction progresses from 30 min to 90 min the plasmon peaks shift from 835 nm to 870 nm and 1840 m to 1962 nm. These shifts in spectra follow the same qualitative trends reported in the literature for 5-40 nm gold rods (with fixed 2.4 aspect ratio), and 9-99 nm gold spheres.

The high selectivity of the $WO_3$ tunnels for species with a 1.7 Å size make them ideal for the incorporation of 1.69 Å $Cs^+$ ions. Doping tungsten oxide with cesium drives the crystal structure to shift from monoclinic to hexagonal, and the free electrons introduced within the system create plasmon peaks in the optical spectra. The high concentration of free electrons yields SPR peaks at far higher energy than those achievable by substitutional doping of metal oxides. Though the broadness of peak 2 makes its assignment as a plasmon inconclusive, the obvious shift of peak 1 in response to changes in solvent RI support its assignment as a plasmon.

The existing literature does not explain the expected connection between particle shape and resonance properties in interstitially-doped semiconductor nanocrystals. Controlling nanocrystal geometry, size, and dielectric environment are preferred parameters for systematically manipulating optical properties, and the foregoing results confirm that all three of these parameters influence SPR properties in tungsten bronze materials. The synthesis of hexagonal $Cs_xWO_3$ as hexagonal prisms, truncated cubes, and pseudo-spheres demonstrates how increasing the number of faces on a nanocrystalline tungsten oxide surface causes the SPR peaks to shift toward one another, eventually becoming one peak.

The foregoing description of the invention has been presented for purposes of illustration and description. It is not intended to be exhaustive or to limit the invention to the precise form disclosed, and modifications and variations are possible in light of the above teachings or may be acquired from practice of the invention. The description was chosen in order to explain the principles of the invention and its practical application. It is intended that the scope of the invention be defined by the claims appended hereto, and their equivalents.

The invention claimed is:

1. An electrochromic device, comprising:
   a first transparent conductor layer;
   a working electrode comprising a nanostructured transition metal oxide bronze layer comprising transition metal oxide nanoparticles;
   a solid state electrolyte layer;
   a counter electrode layer;
   a second transparent conductor layer; and
   at least one protective layer comprising an electrically insulating material configured to prevent or reduce interactions between charge carriers from the electrolyte layer and the transition metal oxide nanoparticles, the charge carriers being generated by exposure of the electrochromic device to ultraviolet (UV) radiation.

2. The electrochromic device of claim 1, wherein the electrically insulating material is configured to prevent the charge carriers released from the electrolyte layer from interacting with the nanostructured transition metal oxide bronze layer.

3. The electrochromic device of claim 2, wherein:
   the electrically insulating material is disposed in shells that encapsulate each transition metal oxide nanoparticle.

4. The electrochromic device of claim 3, wherein the electrically insulating material comprises at least one of a niobium oxide, a zinc oxide, an indium oxide, and a tantalum oxide.

5. The electrochromic device of claim 2, wherein the solid state electrolyte layer comprises a material containing:
   at least one polymer; and
   metal ions comprising at least one of an alkali metal, an alkaline earth metal, and a lanthanide,
   wherein the electrically insulating material allows the metal ions to diffuse from the electrolyte layer into the nanostructured transition metal oxide bronze layer.

6. The electrochromic device of claim 5, wherein:
   the metal ions in the electrolyte layer include at least one of lithium ions, sodium ions, and potassium ions;
   the electrically insulating material comprises at least one of tantalum pentoxide ($Ta_2O_5$), niobium oxide, and indium oxide and is configured to prevent or reduce the charge carriers from interaction with the nanostructured transition metal oxide bronze layer by decreasing proton reduction of the transition metal oxide.

7. The electrochromic device of claim 5, wherein:
the metal ions in the electrolyte layer include at least one of lithium ions, sodium ions, and potassium ions;
the electrically insulating material comprises tantalum pentoxide ($Ta_2O_5$); and
the tantalum pentoxide prevents or reduces the charge carriers from interaction with the nanostructured transition metal oxide bronze layer by decreasing proton reduction of the transition metal oxide nanoparticles.

8. The electrochromic device of claim 6, wherein: the at least one of tantalum pentoxide ($Ta_2O_5$), niobium oxide, and indium oxide is provided in a barrier between the electrolyte layer and the working electrode; and the polymer comprises at least one hydroxyl functional group.

9. The electrochromic device of claim 1, wherein the transition metal oxide nanoparticles comprise a mixture of transition metal oxide nanoparticles having a cubic unit cell crystal lattice structure and transition metal oxide nanoparticles having a hexagonal unit cell crystal lattice structure.

10. An electrochromic device, comprising:
a first transparent conductor layer;
a working electrode comprising:
a nanostructured transition metal oxide bronze layer comprising one or more transition metal oxide and one or more dopant species;
a solid state electrolyte layer;
a counter electrode layer;
a second transparent conductor layer; and
at least one protective layer configured to reduce degradation of the nanostructured transition metal oxide bronze layer due to ultraviolet (UV) radiation;
wherein the nanostructured transition metal oxide bronze layer comprises a plurality of transition metal oxide bronze nanoparticles, wherein a first portion of the plurality of transition metal oxide bronze nanoparticles have a cubic unit cell lattice structure, and wherein a second portion of the plurality of transition metal oxide bronze nanoparticles have a hexagonal unit cell lattice structure;
wherein the working electrode further comprises at least one of indium oxide or zinc oxide based UV radiation absorbing nanoparticles, and wherein:
the first portion of the plurality of transition metal oxide bronze nanoparticles comprises 40 to 70 wt % of all nanoparticles in the working electrode;
the second portion of the plurality of transition metal oxide bronze nanoparticles comprises 15 to 35 wt % of all nanoparticles in the working electrode; and
the UV radiation absorbing nanoparticles comprise 15 to 35 wt % of all nanoparticles in the working electrode.

11. The electrochromic device of claim 10, wherein the working electrode further comprises 5-10 wt % amorphous niobium oxide nanostructures, based on a total weight of all nanoparticles in the working electrode.

12. An electrochromic device, comprising:
a first transparent conductor layer;
a working electrode comprising:
a nanostructured transition metal oxide bronze layer comprising one or more transition metal oxide and one or more dopant species;
a solid state electrolyte layer;
a counter electrode layer;
a second transparent conductor layer; and
at least one protective layer configured to reduce degradation of the nanostructured transition metal oxide bronze layer due to ultraviolet (UV) radiation;
wherein:
the at least one protective layer comprises a UV radiation absorbing material;
the UV radiation absorbing material comprises at least one of indium(III) oxide ($In_2O_3$), zinc(II) oxide (ZnO), indium tin oxide (ITO), aluminum-doped zinc oxide (AZO), and an organic material;
the UV radiation absorbing material comprises one or more UV radiation absorbing layer; and
the one or more UV radiation absorbing layer comprises at least one of:
a layer of the UV radiation absorbing material disposed on an opposite side of the first transparent conductor layer from the working electrode; and
a layer of the UV radiation absorbing material located between the nanostructured transition metal oxide bronze layer and the first transparent conductor layer.

13. The electrochromic device of claim 12, wherein the one or more UV radiation absorbing layer comprises a thin film of at least one of indium oxide and zinc oxide.

14. The electrochromic device of claim 13, wherein the one or more UV radiation absorbing layer further comprises at least one organic laminate layer.

15. The electrochromic device of claim 1, wherein:
the working electrode further comprises transparent conducting oxide nanoparticles;
the transition metal oxide nanoparticles selectively modulate transmittance of visible radiation and a first range of near-infrared (NIR) radiation as a function of a voltage applied to the device; and
the transparent conducting oxide nanoparticles selectively modulate transmittance of a second range of NIR radiation as a function of the voltage applied to the device, wherein a portion of the second range overlaps with the first range.

16. The electrochromic device of claim 15, further comprising one or more dopant species in the transition metal oxide bronze layer that comprise ions that cause a surface plasmon resonance effect on the transition metal oxide nanoparticles by creating delocalized electron carriers that selectively modulate transmittance of the first range of NIR radiation in response to a first applied voltage to the device.

17. The electrochromic device of claim 15, wherein the working electrode further comprises at least one nanostructured amorphous transition metal oxide that selectively modulates transmittance of visible radiation to absorb shorter wavelength visible radiation than the longer wavelength visible radiation absorbed by the transition metal oxide nanoparticles.

18. The electrochromic device of claim 17, wherein the at least one nanostructured amorphous transition metal oxide selectively modulates transmittance of a range of visible radiation having wavelengths of around 400-500 nm as a function of a voltage applied to the device.

19. The electrochromic device of claim 17, wherein the at least one nanostructured amorphous transition metal oxide comprises at least one of a molybdenum oxide, titanium oxide, a vanadium oxide, or a niobium oxide.

20. The electrochromic device of claim 17, wherein the at least one nanostructured amorphous transition metal oxide comprises amorphous niobium oxide nanoparticles or an amorphous web.

21. The electrochromic device of claim 16, wherein:
the dopant species ions that cause the surface plasmon resonance effect comprise at least one of cesium ions, cerium ions, rubidium ions, and lanthanum ions; and
the transition metal oxide nanoparticles comprise tungsten oxide ($WO_{3-x}$), where $0 \leq x \leq 0.1$.

22. The electrochromic device of claim 16, wherein:
the dopant species further comprise intercalation ions configured to cause a change in the oxidation state of transition metal ions in the transition metal oxide nanoparticles by intercalation into and deintercalation from the transition metal oxide nanoparticles;
the change in the oxidation state selectively modulates transmittance of visible radiation in response to a second applied voltage; and
the second applied voltage has a larger magnitude than the first applied voltage.

23. The electrochromic device of claim 22, wherein the intercalation ions comprise at least one of sodium, potassium, and lithium ions which migrate between the solid state electrolyte layer and the nanostructured transition metal oxide bronze layer.

24. The electrochromic device of claim 15, wherein the transparent conducting oxide nanoparticles comprise at least one of indium oxide based nanoparticles and zinc oxide based nanoparticles.

25. The electrochromic device of claim 24, wherein the transparent conducting oxide nanoparticles are mixed with the transition metal oxide nanoparticles and at least one nanostructured amorphous transition metal oxide.

26. The electrochromic device of claim 24, wherein the transparent conducting oxide nanoparticles are mixed with the transition metal oxide nanoparticles, and the transparent conducting oxide nanoparticles block UV radiation.

27. The electrochromic device of claim 24, wherein:
the electrolyte layer comprises an electrolyte material including at least one plasticizer; and
the electrolyte material permeates into crevices between the transition metal oxide nanoparticles and the transparent conducting oxide nanoparticles.

28. The electrochromic device of claim 24, wherein selectively modulating transmittance of the second range of NIR radiation is based on a surface plasmon resonance effect caused by free electron charge carriers in the transparent conducting oxide nanoparticles, wherein:
the free electron charge carriers are created based on at least one metallic cation in the transparent conducting oxide nanoparticles; and
the surface plasmon resonance effect selectively modulates transmittance of the second range of NIR radiation in response to a first applied voltage to the device.

29. The electrochromic device of claim 15, wherein the transition metal oxide nanoparticles comprises at least one of niobium, tungsten, molybdenum, vanadium, and titanium oxide.

30. The electrochromic device of claim 29, wherein the transition metal oxide nanoparticles comprises tungsten oxide ($WO_{3-x}$), where $0 \leq x \leq -0.1$.

31. The electrochromic device of claim 29, wherein the transition metal oxide nanoparticles comprises titanium dioxide ($TiO_{2-x}$), where $0 \leq x \leq 0.1$, and further comprising a dopant species which comprises niobium ions.

32. The electrochromic device of claim 15, wherein the counter electrode further comprises at least one nanostructured amorphous transition metal oxide that selectively modulates transmittance of visible radiation to absorb shorter wavelength visible radiation than the longer wavelength visible radiation absorbed by the nanostructured transition metal oxide bronze layer in the working electrode.

33. The electrochromic device of claim 32, wherein the amorphous transition metal oxide nanoparticles selectively modulate visible radiation having wavelengths within around 400-500 nm, and wherein the at least one nanostructured amorphous transition metal oxide comprises amorphous nickel.

34. The electrochromic device of claim 15, wherein the counter electrode layer comprises a passive electrode that is transparent to radiation in infrared (IR) and visible spectral regions radiation regardless of the applied voltage, and wherein the passive electrode is capable of undergoing oxidation and reduction.

35. The electrochromic device of claim 1, wherein the electrolyte layer comprises an electrolyte polymer that is stable upon absorption of UV radiation.

36. The electrochromic device of claim 1, wherein:
the at least one protective layer comprises a nanoparticle layer formed from a first ink; and
the transition metal oxide nanoparticles are formed from a second ink above or below the at least one protective layer.

* * * * *